US 012363444B2

(12) United States Patent
Hirayama

(10) Patent No.: US 12,363,444 B2
(45) Date of Patent: Jul. 15, 2025

(54) ILLUMINATION CONTROL APPARATUS FOR CAPTURING IMAGE USING PLURALITY OF ILLUMINATION APPARATUSES, ILLUMINATION CONTROL SYSTEM, AND IMAGING APPARATUS

(71) Applicant: CANON KABUSHIKI KAISHA, Tokyo (JP)

(72) Inventor: Keita Hirayama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 231 days.

(21) Appl. No.: 18/161,994

(22) Filed: Jan. 31, 2023

(65) Prior Publication Data
US 2023/0254590 A1     Aug. 10, 2023

(30) Foreign Application Priority Data
Feb. 4, 2022   (JP) ................. 2022-016472

(51) Int. Cl.
  *H04N 23/74*    (2023.01)
  *H04N 23/56*    (2023.01)
  *H04N 23/71*    (2023.01)

(52) U.S. Cl.
  CPC ............. *H04N 23/74* (2023.01); *H04N 23/56* (2023.01); *H04N 23/71* (2023.01)

(58) Field of Classification Search
  CPC ........ H04N 23/74; H04N 23/56; H04N 23/71; H04N 23/663; H04N 23/667;
  (Continued)

(56) References Cited

U.S. PATENT DOCUMENTS 4,573,786 A * 3/1986 Taniguchi ............. G03B 15/05
                                                                 396/159
4,870,438 A    9/1989 Taniguchi et al.
(Continued)

FOREIGN PATENT DOCUMENTS

| EP | 0985958 B   | 3/2000 |
| JP | 07-159844 A | 6/1995 |
| JP | 6891019 B   | 6/2021 |

OTHER PUBLICATIONS

The above documents were cited in a British Search Report issued on Jul. 21, 2023, a copy of which is enclosed, that issued in the corresponding British Patent Application No. 2301335.2.

(Continued)

*Primary Examiner* — Twyler L Haskins
*Assistant Examiner* — John H Morehead, III
(74) *Attorney, Agent, or Firm* — Cowan, Liebowitz & Latman, P.C.

(57) ABSTRACT

An illumination control apparatus which is capable of preventing illumination with insufficient light in main light emission when multiple illumination apparatuses are used for image capturing. The illumination control apparatus includes a communication unit that is communicable with the illumination apparatuses. Light amount information based on maximum light emission amounts of illumination apparatuses with which communication has been established by the communication unit is output. A required light emission amount required for image capturing by an imaging unit is obtained. Based on the required light emission amount, light emission amounts of illumination apparatuses for use in main light emission during image capturing among the illumination apparatuses with which communication has been established by the communication unit are determined. The illumination apparatuses for use in the main (Continued)

light emission are controlled to emit light with the determined light emission amounts.

17 Claims, 13 Drawing Sheets

(58) Field of Classification Search
CPC ...... H04N 23/672; H04N 23/72; H05B 47/19; H05B 47/155; H05B 47/195; G03B 15/02; G03B 15/03; G03B 15/05; Y02B 20/40
See application file for complete search history.

(56) References Cited

U.S. PATENT DOCUMENTS

| | | | |
|---|---|---|---|
| 5,055,865 A | 10/1991 | Fujino et al. | |
| 6,404,987 B1* | 6/2002 | Fukui | G03B 15/05 |
| | | | 396/173 |
| 8,553,103 B1* | 10/2013 | Samadani | H04N 21/4223 |
| | | | 348/364 |
| 9,198,262 B1* | 11/2015 | Bosua | H05B 47/19 |
| 10,345,681 B2* | 7/2019 | Jiang | H04N 23/56 |
| 2014/0009671 A1* | 1/2014 | Ozone | G03B 17/566 |
| | | | 348/370 |
| 2014/0192551 A1* | 7/2014 | Masaki | A61B 1/0661 |
| | | | 362/574 |
| 2016/0142604 A1 | 5/2016 | Gouji et al. | |
| 2019/0068855 A1 | 2/2019 | Saito | |
| 2019/0261498 A1* | 8/2019 | Akita | A61B 1/0638 |
| 2020/0195821 A1* | 6/2020 | Miyazaki | H04N 23/74 |
| 2021/0306540 A1* | 9/2021 | Murakami | H05B 45/10 |
| 2022/0417412 A1* | 12/2022 | Sugawara | H04N 23/663 |

OTHER PUBLICATIONS

The above document was cited in a British Search Report issued on Feb. 29, 2024, a copy of which is enclosed, that issued in the corresponding British Patent Application No. GB2301335.2.

* cited by examiner

ILLUMINATION CONTROL APPARATUS FOR CAPTURING IMAGE USING PLURALITY OF ILLUMINATION APPARATUSES, ILLUMINATION CONTROL SYSTEM, AND IMAGING APPARATUS

BACKGROUND OF THE INVENTION

Field of the Invention

The present invention relates to illumination control apparatuses, illumination control systems, and imaging apparatuses.

Description of the Related Art

Clip-on illumination apparatuses and illumination apparatuses fixed to respective stands have been used for shooting. In such shooting, for example, a photographer places an illumination apparatus fixed to a stand around a subject and controls the shade of the subject by diffusing light from the illumination apparatus using an umbrella, a diffuser, or the like. In shooting with such an illumination apparatus, the location and the amount of light emission of the illumination apparatus is adjusted so that a desired amount of light is applied to the subject.

For another example, the following shooting is known in which a plurality of illumination apparatuses is used in order to prevent a subject from being illuminated with insufficient light in a case where the subject is far or is in a wide space. In the shooting, the plurality of illumination apparatuses is fixed to the same stand and light sources of the respective illumination apparatuses are brought close to one another so that a large amount of light is artificially made by the illumination apparatuses. When a large amount of light is emitted repeatedly during shooting using those illumination apparatuses, some of consecutive light emissions may fail because the speed at which the illumination apparatuses are charged is too slow relative to the camera's consecutive shooting speed, or light emissions may fail because of a restriction on heating.

Japanese Laid-Open Patent Publication (Kokai) No. H07-159844 discloses a control system in which identification numbers are assigned to a plurality of sub accessories connected to a main accessory, and communications with the sub accessories are carried out independently of one another, so that the identification numbers can be easily recognized.

The disclosed control system is equipped with a function of identifying main accessories and sub accessories in a plurality of illumination apparatuses and a function of communicating with them. However, the control system does not control the illumination apparatuses to change their light emissions according to the states of communications with the respective illumination apparatuses, and hence setting change operations are performed on respective illumination apparatuses. For this reason, there is room for improvement in preventing illumination with insufficient light and failure of light emission in main light emission in shooting.

SUMMARY OF THE INVENTION

The present invention provides illumination control apparatuses, illumination control systems, and imaging apparatuses, which are capable of preventing illumination with insufficient light in main light emission when a plurality of illumination apparatuses is used for image capturing.

According to an aspect of the invention, an illumination control apparatus that controls a plurality of illumination apparatuses for use in image capturing by an imaging unit is provided. The illumination control apparatus includes a communication unit that is communicable with the plurality of illumination apparatuses, and at least one processor. The at least one processor is configured to perform operations of outputting light amount information based on maximum light emission amounts of illumination apparatuses with which communication has been established by the communication unit among the plurality of illumination apparatuses, and obtaining a required light emission amount indicating a light emission amount required for image capturing by the imaging unit. The at least one processor is further configured to perform operations of, based on the required light emission amount, determining light emission amounts of illumination apparatuses for use in main light emission during image capturing among the illumination apparatuses with which communication has been established by the communication unit, and controlling the illumination apparatuses for use in the main light emission to emit light with the determined light emission amounts.

According to another aspect of the invention, an illumination control system that controls a plurality of illumination apparatuses for use in image capturing by an imaging unit is provided. The illumination control system includes a plurality of illumination apparatuses and the above-described illumination control apparatus.

According to another aspect of the invention, an imaging apparatus for image capturing using a plurality of illumination apparatuses is provided. The imaging apparatus includes an imaging unit that captures an image, and the above-described illumination control apparatus.

According the present invention, it is possible to prevent illumination with insufficient light in main light emission when a plurality of illumination apparatuses is used for image capturing.

Further features of the present invention will become apparent from the following description of exemplary embodiments with reference to the attached drawings.

DESCRIPTION OF THE EMBODIMENTS

The present invention will now be described in detail with reference to the accompanying drawings showing embodiments thereof.

First Embodiment

Figure 1:
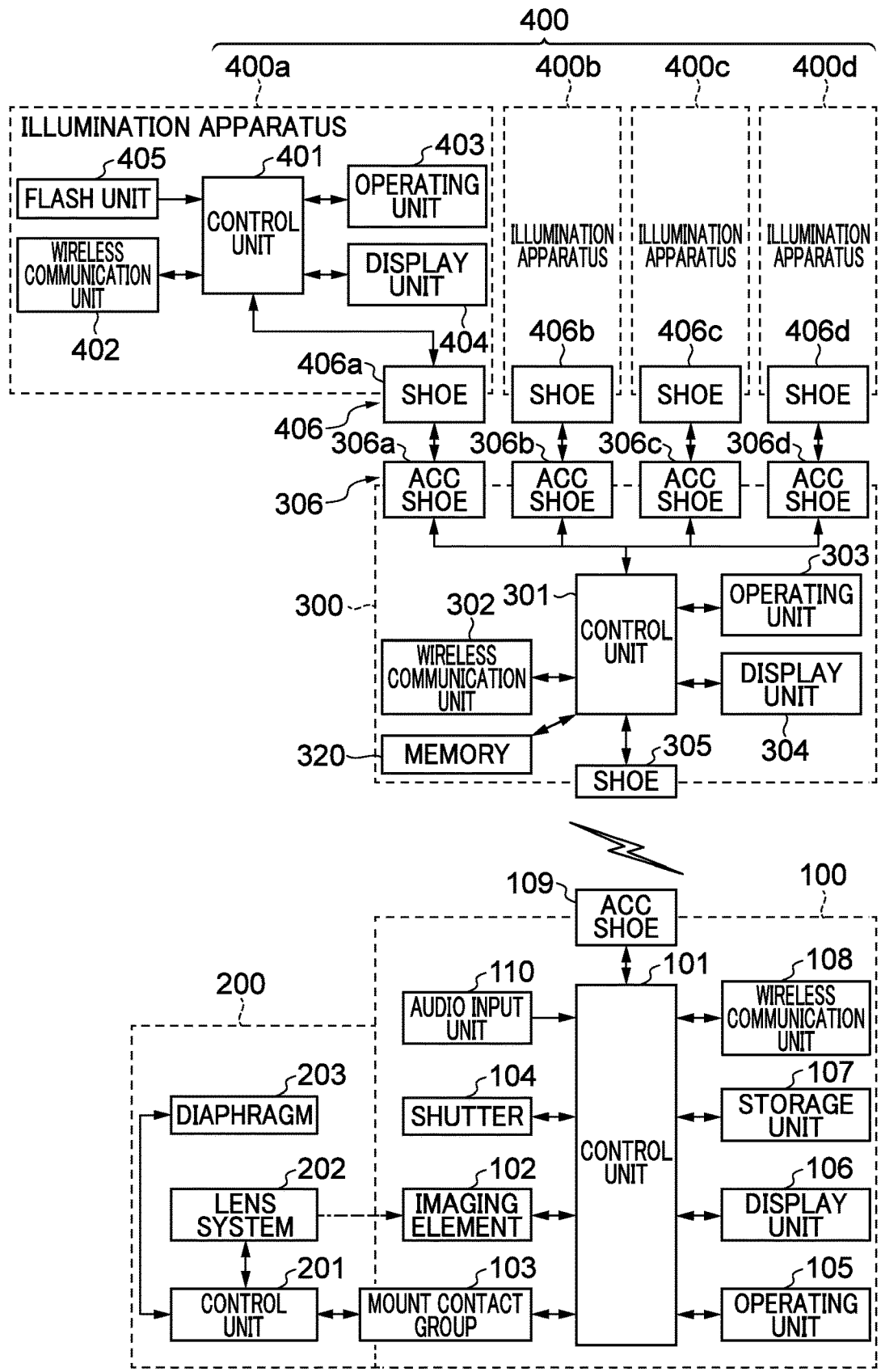
FIG. 1 is a block diagram illustrating an overall configuration of an imaging system.

FIG. 1 is a block diagram illustrating an overall configuration of an imaging system in which an illumination control apparatus according to the first embodiment is used. The imaging system (illumination control system) includes a camera 100 as an imaging apparatus (or an imaging unit), a shooting lens 200, a control apparatus 300 as the illumination control apparatus, and a plurality of illumination apparatuses 400. In the present embodiment, the imaging system includes, for example, four illumination apparatuses 400a to 400d.

The shooting lens 200 is attached to the front of the camera 100. The shooting lens 200 is interchangeable. The camera 100 and the shooting lens 200 are electrically connectable together via a mount contact group 103. An ACC shoe (accessory shoe) 109 is provided on an upper surface of the camera 100. A camera control unit 101 is, for example, a microcomputer that includes one or more processors incorporated therein to control the operation of components of the camera 100. The camera control unit 101 also includes a built-in memory that stores various adjustment values, programs for various types of control, and so forth. The built-in memory also serves as a buffer memory that temporarily stores various types of data processed at various components.

An imaging element 102 is a device for capturing an image of a subject. The imaging element 102 is configured to convert light from the subject, which has entered the imaging element 102 through a lens system 202, into an electric signal to generate an image signal including a still image or video, and output the electric signal to the camera control unit 101. A shutter 104, which is a focal plane shutter, is disposed between the imaging element 102 and the lens system 202 and operates in accordance with instructions from the camera control unit 101. The shutter 104 is comprised of a front curtain and a rear curtain. The front curtain is configured to travel to open the shutter 104, which starts exposure of the imaging element 102 to light. The rear curtain is configured to travel to close the shutter 104, which ends the exposure of the imaging element 102.

An operating unit 105 includes operating members on which a user performs operations. The operating unit 105 is configured to detect operations performed by the user via a button, a switch, a dial, a connected device, or another operating member, and send signals corresponding to operating instructions to the camera control unit 101. In a still image mode, the operating unit 105 is configured to output an instruction signal, which is issued when the user has pressed a release button halfway down (hereafter referred to as the SW1 signal), to the camera control unit 101. The operating unit 105 is also configured to output an instruction signal, which is issued when the user has deeply pressed the release button all the way down (hereafter referred to as the SW2 signal), to the camera control unit 101. In a video mode, the operating unit 105 is configured to output an instruction signal, which is issued when the user has operated a recording button (hereafter referred to as the REC signal), to the camera control unit 101. A display unit 106 is configured to display shooting information and captured images in accordance with instructions from the camera control unit 101.

The camera control unit 101 is configured to control the operation of the camera 100 based on output signals from the operating unit 105. When an output signal from the operating unit 105 is the SW1 signal, the camera control unit 101 is configured to drive the imaging element 102 to capture an image, and output focus information like the amounts of defocus at respective distance measurement points. The camera control unit 101 is also configured to repeatedly perform metering control (AE operation) in which it detects a subject from an image capturing result and measures the brightness of the subject, and based on metering results, determine the shutter speed, aperture value, and ISO sensitivity for use in shooting. Here, the shutter speed, aperture value, and ISO sensitivity for use in shooting are collectively referred to as "exposure control values". The determined exposure control values are displayed on the screen of the display unit 106.

When an output signal from the operating unit 105 is the SW2 signal, the camera control unit 101 is configured to drive a diaphragm 203 in the lens system 202, set the sensitivity (ISO sensitivity) of the imaging element 102, and control the shutter 104 to cause light having passed through the lens system 202 to fall on the imaging element 102.

When an output signal from the operating unit 105 is the REC signal, the camera control unit 101 is configured to set the sensitivity (ISO sensitivity) and frame rate of the imaging element 102, drive the imaging element 102 to capture an image, and output focus information like the amounts of defocus at respective distance measurement points. The camera control unit 101 is also configured to cause light having passed through the lens system 202 to fall on the imaging element 102 while repeatedly performing metering control (AE operation) in which it detects a subject from an image capturing result and measures the brightness of the subject. In accordance with instructions from the camera control unit 101, the camera control unit 101 is configured to repeatedly perform auto focusing by driving a focus lens (which is not illustrated) for adjusting the focus in the lens system 202.

The camera control unit 101 is configured to cause the display unit 106 to display a shot image on its screen according to image data obtained from the imaging element 102, and write image data (including image data with audio information) in a storage unit 107.

A wireless communication unit 108 is a wireless communication module like an infrared communication module, Bluetooth communication module, or a wireless LAN communication module. The wireless communication unit 108 is configured to carry out wireless communications with external apparatuses, and send and receive data such as an image signal, an audio signal, compressed image data, and compressed audio data. The wireless communication unit 108 is also configured to send and receive control signals relating to shooting such as a shooting start command and a shooting end command as well as other information.

The ACC shoe 109, to which a variety of external accessories with shoes (or shoe mounting feet) are connectable, is communicable with the external accessories via a contact group, which is not illustrated, provided in the ACC shoe 109. An audio input unit 110 is configured to pick up sound around the camera 100 through a built-in microphone or an external microphone connected to the audio input unit 110 via an audio input terminal, perform analog-to-digital conversion of the obtained audio data to obtain a digital audio signal, and send the digital audio signal to the camera control unit 101. The camera control unit 101 is configured to subject the input digital audio signal to audio-related processes such as a level optimization process, a specific frequency reducing process, and an audio detection process. The camera control unit 101 is configured to carry out a synthesis process on image data obtained by the imaging element 102 and audio data obtained through the external microphone, and write the image data with the audio information in the storage unit 107.

A description will now be given of a configuration of the shooting lens 200. A lens control unit 201 is, for example, a microcomputer that includes one or more processors incorporated therein to control the operation of components of the shooting lens 200. The lens system 202 is comprised of a plurality of lenses including, for example, the focus lens, so as to form a subject image on the imaging element 102. The diaphragm 203 for adjusting the amount of light is provided in the shooting lens 200. The lens control unit 201 is configured to control the components of the shooting lens 200 via the mount contact group 103 to adjust the amount of light taken into the camera 100 and the focus in accordance with an instruction from the camera control unit 101, and sends distance information at that time to the camera control unit 101.

A description will now be given of a configuration of the control apparatus 300. The control apparatus 300 is, for example, a microcomputer that includes one or more processors incorporated therein to control the operation of components of the control apparatus 300. A memory 320 stores various adjustment values, programs for a control unit 301 to perform various types of control, and so forth.

The control unit 301 is wirelessly communicable with the wireless communication unit 108 of the camera 100 and wireless communication units of respective external illumination apparatuses such as illumination apparatuses 400a to 400d through a wireless communication unit 302. The wireless communication unit 302 is a wireless communication module like an infrared communication module, Bluetooth (registered trademark) communication module, or a wireless LAN communication module. For example, the wireless communication unit 302 is capable of receiving an instruction for light emission (light emission instruction) and camera information from the camera 100, and also sending and receiving control apparatus information, and illumination apparatus information. The wireless communication unit 302 is also capable of sending and receiving control signals related to shooting, which includes a shooting start command and a shooting end command, as well as other information.

The control unit 301 may connect to the ACC shoe 109 of the camera 100 via a shoe (or a shoe mounting foot) 305 and communicate with the camera control unit 101. That is, communication with the camera control unit 101 can be either wired or wireless.

An operating unit 303 includes operating members on which a user performs operations. The operating unit 303 is configured to detect operations performed by the user via a button, a dial, or another operating member, and send signals corresponding to operating instructions to the control unit 301. In accordance with instructions from the control unit 301, a display 304 is configured to display information including a state of communication with the camera 100 and states of connection with the respective illumination apparatuses 400a to 400d.

ACC shoes (accessory shoes) 306 are connecting units to which a plurality of illumination apparatuses 400 is connected and which hold the plurality of illumination apparatuses 400. In the present embodiment, the control apparatus 300 includes, for example, four ACC shoes 306a to 306d. FIG. 1 illustrates a state in which shoes (or shoe mounting feet) 406 (406a to 406d) of the illumination apparatuses 400 are connected to the ACC shoes 306a to 306d. The ACC shoes 306 may function as communication units or communication interfaces communicating with the plurality of illumination apparatuses 400.

Although the ACC shoes 306 of the control apparatus 300 are provided at the four locations, there can be any number of ACC shoes 306. Corresponding ones of the ACC shoes 306a to 306d, the illumination apparatuses 400a to 400d, and the shoes 406a to 406d are designated by the same letters a, b, c, and d in terms of connection. The illumination apparatuses 400a to 400d have the same configuration. The ACC shoes 306a to 306d of the control apparatus 300 have the same configuration. Therefore, in the following description, the configurations of only the ACC shoe 306a of the control apparatus 300, the shoe 406a of the illumination apparatus 400a, and the illumination apparatus 400a will be described as typical examples. The appearance of the illumination apparatuses 400a to 400d connected to the ACC shoes 306a to 306d of the control apparatus 300 will be described later with reference to FIG. 10.

Any one of the illumination apparatuses 400a to 400d can be connected to the ACC shoe 306a of the control apparatus 300. An illumination apparatus connected to the ACC shoe 306a is referred to as the illumination apparatus 400a. The ACC shoe 306a is communicable with an illumination apparatus control unit 401 of the illumination apparatus 400a via a contact group provided in the ACC shoe 306a and capable of sending and receiving illumination apparatus information, control apparatus information, and so forth.

A description will now be given of a configuration of the illumination apparatus 400a. The illumination apparatus control unit 401 is, for example, a microcomputer that has one or more processors incorporated therein to control the operation of components of the illumination apparatus 400a. The illumination apparatus control unit 401 is communicable with the control unit 301 via the shoe (or shoe mounting foot) 406a of the illumination apparatus 400a and the ACC shoe 306a of the control apparatus 300 and capable of sending and receiving an instruction for light emission, an instruction for the light amount, an instruction for the illumination angle, and illumination apparatus information.

As with the wireless communication unit 108 of the camera 100 and the wireless communication unit 302 of the control apparatus 300, a wireless communication unit 402 is wirelessly communicable with other illumination apparatuses, which is not illustrated, as well as the camera 100 and the control apparatus 300. The wireless communication unit 402 is a wireless communication module like an infrared communication module, Bluetooth communication module, or a wireless LAN communication module.

An operating unit 403 includes operating members such as a power switch, a mode setting switch for setting an operating mode, and setting buttons for setting various parameters. In response to inputs to the operating unit 403, the illumination apparatus control unit 401 is configured to carry out various processes.

A display unit 404 is configured to display information such as setting information according to inputs to the operating unit 403 and states of communication with the control apparatus 300 and the illumination apparatus 400a. A flash unit 405 is configured to receive an instruction for light emission from the illumination apparatus control unit 401 and emit a designated amount of light at a designated light emission time. The flash unit 405 is configured to emit light as main light emission at the same time as image capturing by the camera 100, and may be further configured to supplementary emit light prior to the main light emission, which is referred to as preliminarily light emission. The flash unit 405 is comprised mainly of a discharge tube, a reflective umbrella and a zoom optical system, and capable of changing the illumination area by movement of the zoom optical system.

Figure 2:
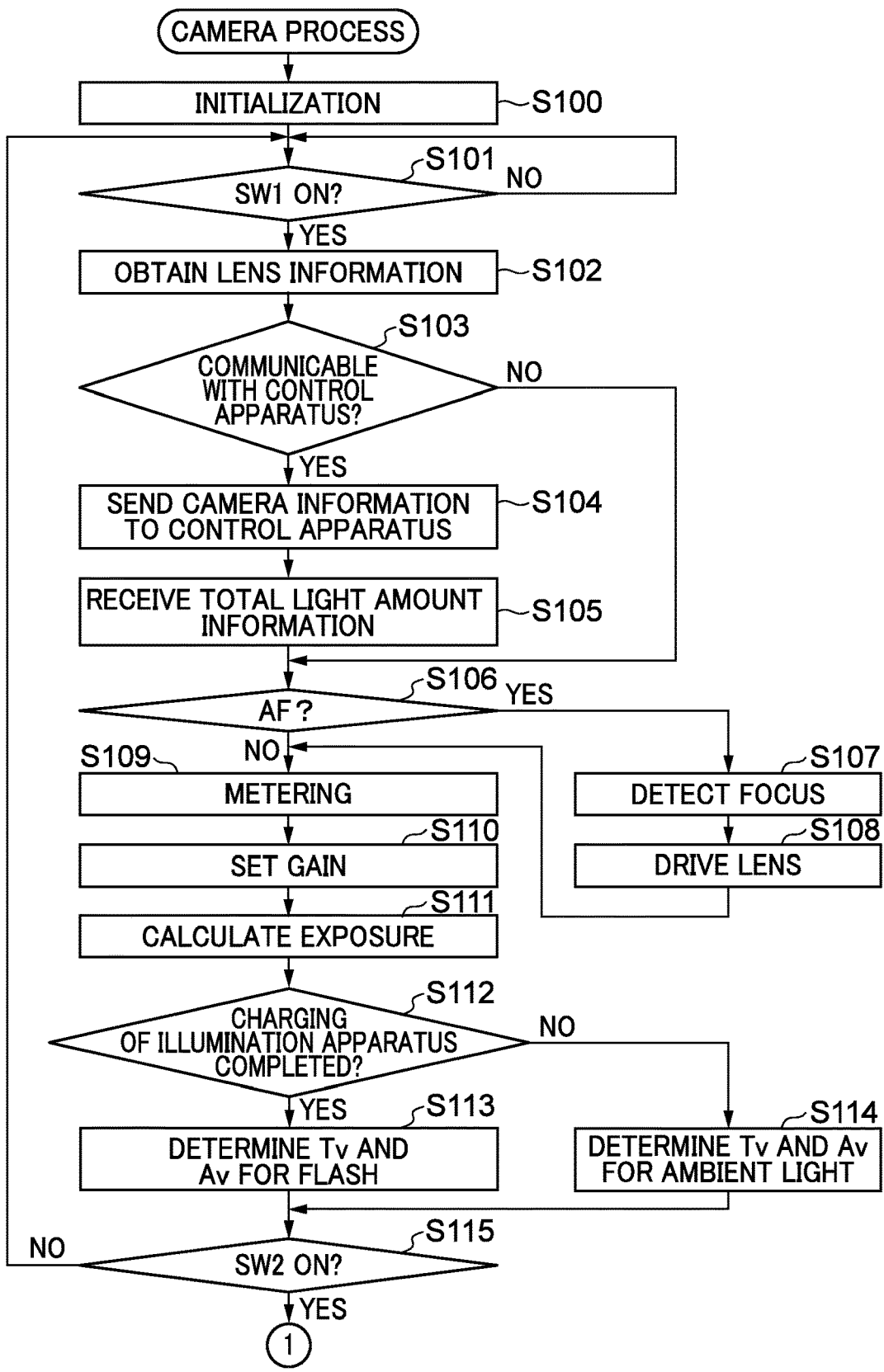
FIGS. 2 and 3 are flowcharts illustrating a process performed by a camera.
Figure 3:
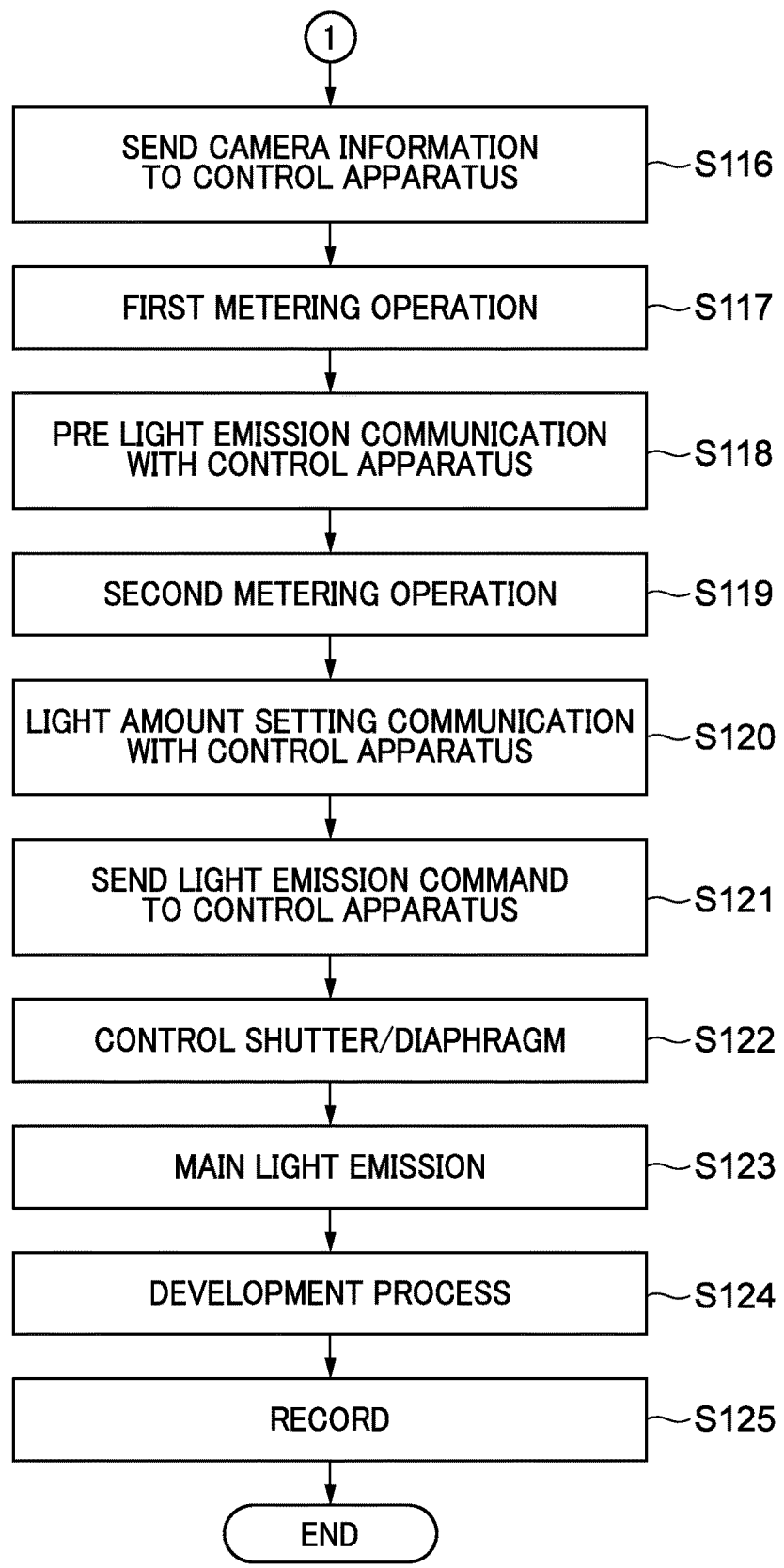

Referring to FIGS. 2 and 3, a description will now be given of a camera process which is a process performed by the camera 100. FIGS. 2 and 3 are flowcharts illustrating the camera process. The camera process is implemented by a CPU provided in the camera control unit 101 loading a program stored in a ROM into a RAM and executing the same. The camera process is started when the camera 100 is made operative by turning on a power switch, which is not illustrated, in the camera 100.

In step S100, the camera control unit 101 initializes memories and ports. The camera control unit 101 also reads a state of a switch input from the operating unit 105 and input information set in advance to set various kinds of shooting mode such as the way of determining the shutter speed and the way of determining the aperture.

In step S101, the camera control unit 101 determines whether or not a shutter button has been pressed halfway down (whether or not the SW1 requesting a preparatory operation for shooting is on), and stands by until the SW1 is turned on. When the SW1 is turned on, the process proceeds to step S102.

In step S102, the camera control unit 101 communicates with the lens control unit 201 via a communication line (the mount contact group 103) to obtain lens information, where the lens information includes information on the focal length of the shooting lens 200 and information required for a focus detection process and a metering process. In step S103, the camera control unit 101 controls the wireless communication unit 108 of the camera 100 to determine whether or not it is possible to communicate with the control apparatus 300. When the camera control unit 101 determines that it is possible to communicate with the control apparatus 300, the process proceeds to step S104. When the camera control unit 101 determines that it is impossible to communicate with the control apparatus 300, the process proceeds to step S106.

In the step S104, the camera control unit 101 communicates with the control unit 301 of the control apparatus 300 via a communication line (the wireless communication unit 108 of the camera 100 and the wireless communication unit 302 of the control apparatus 300). Then, the camera control unit 101 sends camera information to the control unit 301 of the control apparatus 300, where the camera information includes the focal length information obtained in the step S102 and a light emission mode set in advance. In response to this, the control unit 301 sends the received focal length information to the illumination apparatus control unit 401 of each light emission apparatus 400. The control unit 301 further instructs the illumination apparatus control unit 401 to output illumination apparatus information stored in a memory in the illumination apparatus control unit 401, and the illumination apparatus control unit 401 outputs the illumination apparatus information to the control unit 301. The illumination apparatus information includes information on a current light emission mode, main capacitor charging information and remaining battery level information.

In step S105, the camera control unit 101 receives total light amount information as control apparatus information from the control apparatus 300. The total light amount information is information on light amount, which indicates the total light amount obtained by adding up the amounts of light emissions of the plurality of illumination apparatuses 400 connected to the control apparatus 300, and is calculated by a calculation process (step S307 in FIG. 4) which will be described later. In other words, the total light amount is the total sum of light given when the plurality of illumination apparatuses 400 whose communication with the control apparatus 300 has been established is caused to emit light at the same time.

In the step S106, the camera control unit 101 determines whether or not a shooting mode set for the camera 100 is a mode in which an auto focus detecting operation is performed (AF mode). When the camera control unit 101 determines that the set shooting mode is the AF mode, the process proceeds to step S107. When the camera control unit 101 determines that the set shooting mode is not the AF mode but an MF mode (manual mode), the process proceeds to step S109.

In the step S107, the camera control unit 101 performs the focus detecting operation using a well-known phase difference detection method. The camera control unit 101 further determines which of the multiple focus detection areas will be focused on with the highest priority, based on input from the operating unit 105 and/or a well-known automatic selection algorithm based on the basic concept that higher priority is given to a near point.

In step S108, the camera control unit 101 causes the RAM in the camera control unit 101 to store the focus detection area determined in the step S107. The camera control unit 101 also calculates the lens drive amount based on an output result of the focal length information. The camera control unit 101 communicates with the lens control unit 201 and instructs it to drive lenses. In response to this, the lens control unit 201 drives the lens system 202 based on a result of the calculation in the step S107 (which corresponds to the lens drive amount). After the step S108, the process proceeds to the step S109.

In the step S109, the camera control unit 101 performs metering using a metering unit, which is not illustrated, to obtain subject brightness values of respective metering areas. In step S110, the camera control unit 101 causes a gain switching unit, which is not illustrated, to perform processing of a gain setting that is input through the operating unit 105. The camera control unit 101 also sends gain setting information to the control unit 301 of the control apparatus 300. In step S111, the camera control unit 101 calculates exposure values from the subject brightness values of the respective metering areas using a well-known algorithm.

In step S112, the camera control unit 101 determines whether or not a charging completion signal (output in step S311, which will be described later) has been received from the control unit 301, where the charging completion signal indicates that charging of the corresponding illumination apparatus 400 has been completed. When the camera control unit 101 determines that the charging completion signal has been received, the process proceeds to step S113. When the camera control unit 101 determines that the charging completion signal has not been received, the process proceeds to step S114.

In the step S112, the result of the determination as to whether or not the charging completion signal has been received from the control unit 301 is stored in the RAM in the camera control unit 101. It should be noted that in the case where it was determined in the step S103 that it was impossible to communicate with the control apparatus 300, the process proceeds to the step S114 without the camera control unit 101 determining in the step S112 whether or not the charging completion signal has been received because there is no illumination apparatus 400 whose communication with the control apparatus 300 has been established.

In the step S113, based on the exposure values calculated in the step S111, the camera control unit 101 determines a shutter speed (Tv) and an aperture value (Av) for flash, which are suitable for flash-use shooting. On the other hand, in the step S114, based on the exposure values calculated in the step S111, the camera control unit 101 determines a shutter speed (Tv) and an aperture value (Av) for ambient light, which are suitable for shooting in which no illumination apparatuses emit light (non-flash shooting). After the steps S113 and S114, the process proceeds to step S115.

In the step S115, the camera control unit 101 determines whether or not the shutter button has been pressed all the way down (SW2 is on). When the camera control unit 101 determines that SW2 is not on, the process returns to the step S101. When the camera control unit 101 determines that SW2 is on, the process proceeds to step S116 (FIG. 3).

In the step S116, the camera control unit 101 communicates with the control unit 301 of the control apparatus 300 to send camera information. In step S117, the camera control unit 101 performs a first metering operation (metering of ambient light) without giving an instruction for light emission to the plurality of illumination apparatuses 400.

In step S118, the camera control unit 101 sends camera information to the control unit 301 of the control apparatus 300 so as to carry out a preliminary light emission communication for causing the plurality of illumination apparatuses 400 to make preliminarily light emission. Here, the camera information includes information on the preliminary light emission communication and a light emission mode sent in step S314 in FIG. 5, which will be described later. It should be noted that the camera information sent to the control unit 301 is transferred to the illumination apparatus control unit 401 of each light emission apparatus 400 via the wireless communication unit 302 of the control apparatus 300 and the corresponding ACC shoe 306 by the control unit 301.

In step S119, the camera control unit 101 performs a second photometric operation while causing the plurality of illumination apparatuses 400 to emit light. Then, based on results of the metering in the steps S117 and S119, the camera control unit 101 calculates the shutter speed, aperture value, and the light emission amount of the illumination apparatuses 400 for shooting, using a well-known calculation method.

In step S120, the camera control unit 101 carries out a light amount setting communication. Here, the camera control unit 101 communicates with the control unit 301 of the control apparatus 300 and sends a required light emission amount Y, which indicates the light emission amount calculated in the step S119. The required light emission amount Y means the light emission amount required for image capturing by the camera 100, in other words, the light emission amount required for the main light emission by the illumination apparatuses 400 at the time of image capturing, and is received by the control apparatus 300 in step S315 (FIG. 5), which will be described later.

In step S121, the camera control unit 101 communicates with the control unit 301 of the control apparatus 300 to send a light emission command. In step S122, the camera control unit 101 operates the shutter and the diaphragm. At this time, based on delay information on the illumination apparatuses 400 and a correction value, which is intended to correct for a change resulting from variations in the operation of the front curtain and stored in the memory in the camera control unit 101, the camera control unit 101 changes the output timing of a front curtain travelling signal (front curtain movement start signal).

In step S123, the camera control unit 101 causes the illumination apparatuses 400 to make main light emission to perform an exposure operation. At this time, the camera control unit 101 carries out a light emission trigger communication with the illumination apparatuses 400 via the control apparatus 300. The camera control unit 101 sends light emission trigger information as an instruction for light emission to the control apparatus 300. In response to this, the control unit 301 of the control apparatus 300 instructs the illumination apparatuses 400, which are to be used for the current image capturing, to make the main light emission.

After the exposure operation is ended, the process proceeds to step S124, in which the camera control unit 101 in turn performs a development process. The camera control unit 101 converts an analog signal, which is output from the imaging element 102 and amplified by the gain switching unit, into a digital signal using an A/D converter. The camera control unit 101 further causes a signal processing circuit to perform predetermined signal processing such as white balance on the image data converted into the digital signal. In step S125, the camera control unit 101 records the processed image data in a memory, which is not illustrated, to end the camera process in FIGS. 2 and 3.

Figure 4:
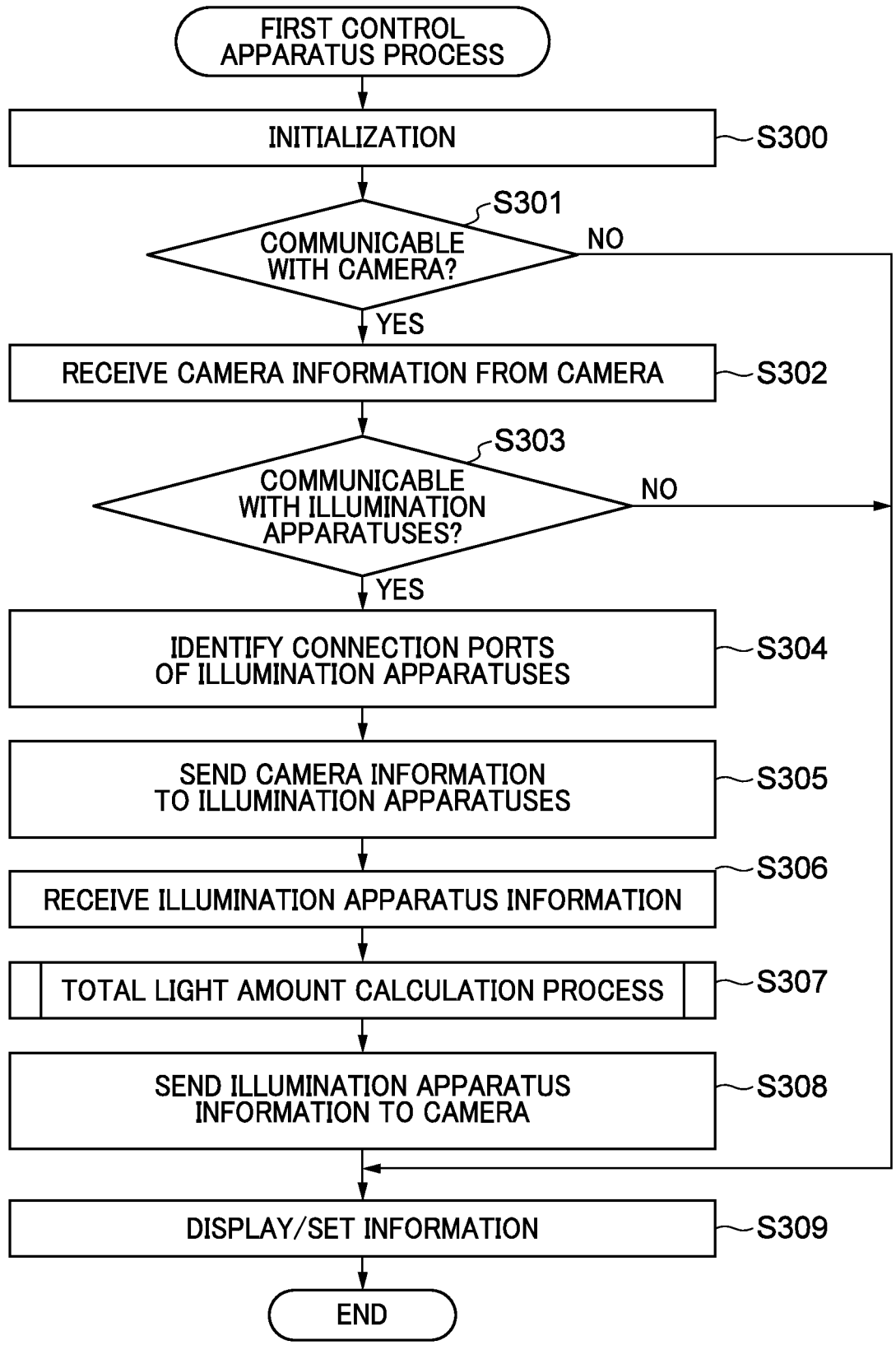
FIG. 4 is a flowchart illustrating a first process performed by a control apparatus.
Figure 5:
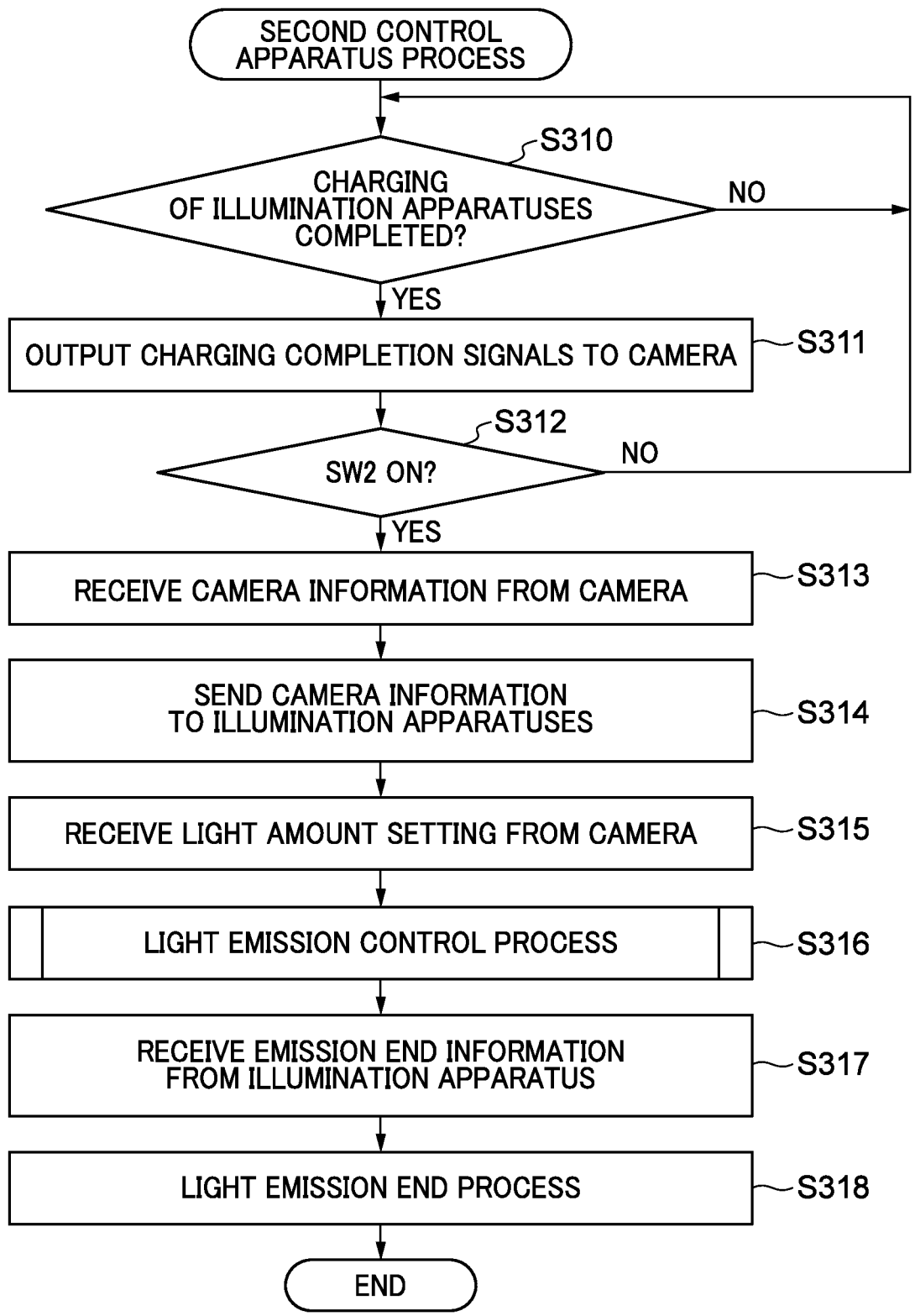
FIG. 5 is a flowchart illustrating a second process performed by a control apparatus.

Referring to FIGS. 4 and 5, a description will now be given of how the control apparatus 300 operates. FIG. 4 is a flowchart illustrating a first control apparatus process which is a process performed by the control apparatus 300. The first control apparatus process is implemented by a CPU provided in the control apparatus 300 loading a program stored in a ROM into a RAM and executing the same. The first control apparatus process is started when the control apparatus 300 is made operative by turning on the power to the control apparatus 300.

In step S300, the control unit 301 initializes memories and ports. The control unit 301 further reads a state of a switch input from the operating unit 303 of the control apparatus 300 and input information set in advance to set a flash-use shooting mode, the light amount, and other information. The information about the flash-use shooting mode, the light amount of, and other information is stored in the RAM in the illumination apparatus control unit 401. When a setting that will carry out wireless communication is made, the control unit 301 controls the wireless communication unit 302 of the control unit 301 to scan channels while switching wireless frequencies and search for the wireless communication unit 108 of the camera 100 and the wireless communication units 402 of the plurality of illumination apparatuses 400 which the control unit 301 is to communicate with.

In step S301, the control unit 301 controls the wireless communication unit 302 of the control apparatus 300 to determine whether or not it is possible to communicate with the camera 100. When the control unit 301 determines that it is possible to communicate with the camera 100, the process proceeds to step S302. When the control unit 301 determines that it is impossible to communicate with the camera 100, the process proceeds to step S309.

In the step S302, the control unit 301 communicates with the camera control unit 101 of the camera 100 via the communication line (the wireless communication unit 108 of the camera 100 and the wireless communication unit 302 of the control apparatus 300). Then, the control unit 301 receives the camera information including the focal length information of the camera 100 and the light emission mode, which was sent in the step S104.

In the step S303, the control unit 301 determines whether or not there is any illumination apparatus 400 with which the control unit 301 is able to communicate via the corresponding ACC shoe 306 of the control apparatus 300 or there is any illumination apparatus 400 with which the control unit 301 is able to communicate via the wireless communication unit 302 of the control apparatus 300. When the control unit 301 determines that there is any illumination apparatus 400 with which the control unit 301 is able to communicate, the process proceeds to step S304. When the control unit 301 determines that there is no illumination apparatus 400 with which the control unit 301 is able to communicate, the process proceeds to the step S309. In the step S304, the control unit 301 identifies the illumination apparatuses 400 with which the control unit 301 is able to communicate (identifies connection ports) via the corresponding ACC shoes 306 of the control apparatus 300 or the wireless communication unit 302 of the control apparatus 300.

Figure 7:
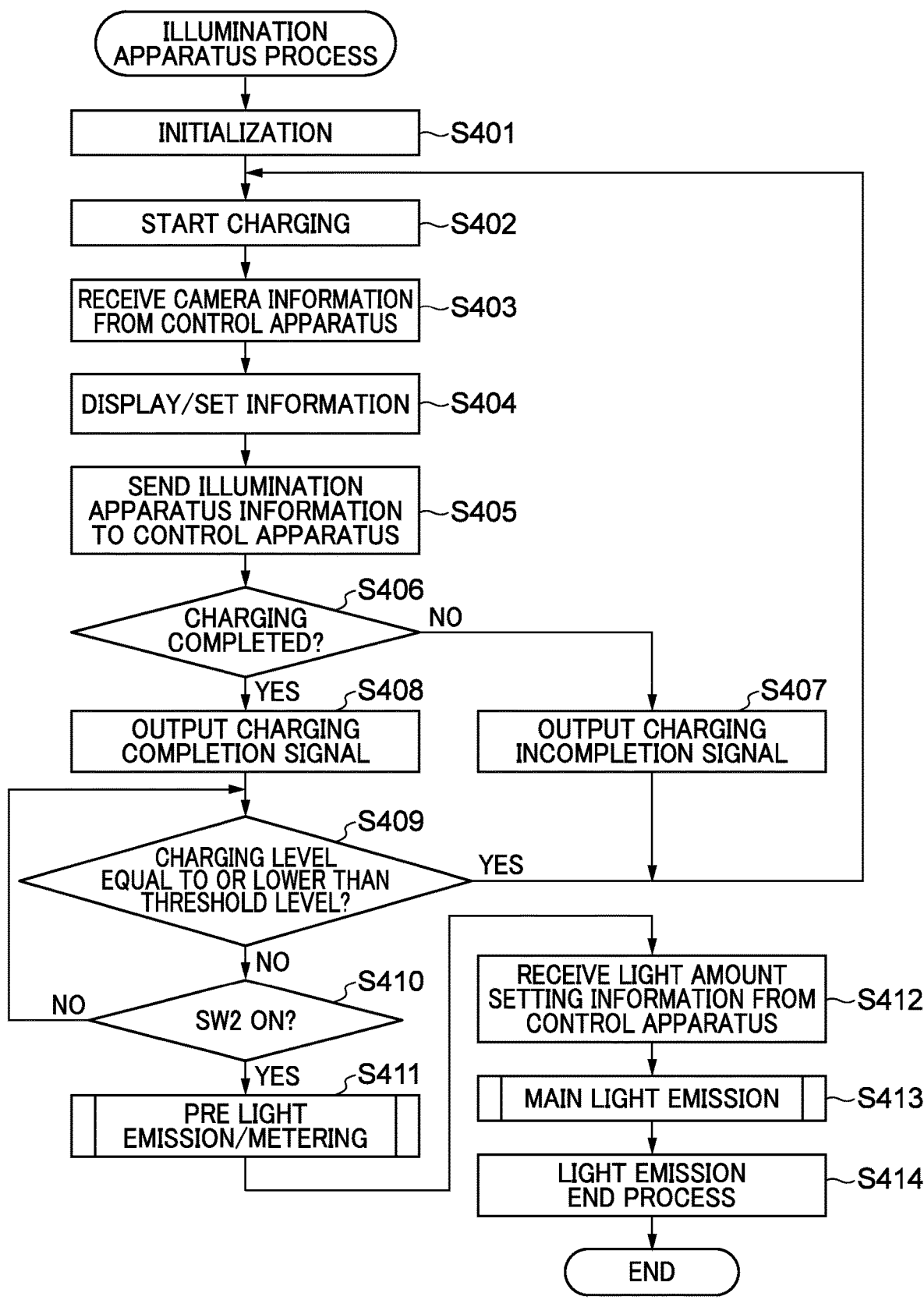
FIG. 7 is a flowchart illustrating a process performed by an illumination apparatus.

In step S305, the control unit 301 sends the camera information including the focal length information and the light emission mode received in the step S302 to the illumination apparatuses 400. The information is received by the illumination apparatuses 400 in step S403 (FIG. 7).

In step S306, the control unit 301 receives information on the illumination apparatuses 400 identified as those which the control unit 301 can communicate with, including individual IDs, setting conditions, and maximum light emission amounts. Thus, the control unit 301 obtains the information indicating the maximum light emission amounts of the respective illumination apparatuses 400 with which communication has been established by the ACC shoes 306 of the control apparatus 300 or the wireless communication unit 302 of the control apparatus 300.

In step S307, based on the information about the illumination apparatuses 400 which are able to communicate with the control apparatus 300, the control unit 301 carries out a total light amount calculation process (FIG. 6), which will be described later. In step S308, the control unit 301 communicates with the camera control unit 101 of the camera 100 to send (output) the information about the illumination apparatuses 400 (illumination apparatus information) obtained in the step S306 and total light amount information obtained in the step S307 to the camera 100.

In the step S309, the control unit 301 displays the illumination apparatus information stored therein on the display unit 304 of the control apparatus 300. In the case where it was determined in the step S301 or the step S303 that communication with the camera 100 or the illumination apparatuses 400 was impossible, a notification process in which, for example, a warning is displayed may be carried out. After the step S309, the control unit 301 ends the process in FIG. 4.

FIG. 5 is a flowchart illustrating a second control apparatus process which is a process performed by the control apparatus 300. The second control apparatus process is implemented by a CPU provided in the control apparatus 300 loading a program stored in a ROM into a RAM and executing the same. The second control apparatus process is started when the first control apparatus process in FIG. 4 has ended.

In step S310, the control unit 301 determines whether or not charging of the illumination apparatuses 400 which are able to communicate with the control apparatus 300 has been completed. The determination is made according to whether the control unit 301 has received a charging completion signal sent in step S408 (FIG. 7) or a charging incompletion signal sent in step S407 (FIG. 7), which will be described later, has been received. When the charging completion signal has been received, the control unit 301 determines that charging of the corresponding illumination apparatus 400 has been completed. When charging of the illumination apparatuses 400 has not been completed, the control unit 301 stands by until charging of the illumination apparatuses 400 is completed. When charging of the illumination apparatuses 400 has been completed, the process proceeds to step S311.

In the step S311, the control unit 301 outputs to the camera control unit 101 the charging completion signals corresponding to the respective illumination apparatuses 400 which are able to communicate with the control apparatus 300. The charging completion signals are used by the camera control unit 101 to determine in the step S112 in FIG. 2 whether or not charging of the respective illumination apparatuses 400 has been completed.

In step S312, based on information from the camera 100, the control unit 301 determines whether or not SW2 that issues an instruction to start shooting has been turned on. When the camera control unit 101 determines that SW2 is off, the process returns to the step S310. When the camera control unit 101 determines that SW2 is on, the process proceeds to step S313.

In the step S313, the control unit 301 receives the camera information including the information on preliminary light emission communication and the light emission mode information, which was sent in the step S118, again. In step S314, the control unit 301 sends, to the illumination apparatus control unit 401 of each light emission apparatus 400, the camera information including the information on preliminary light emission (including a start signal for preliminary light emission) and the light emission mode information, which was received in the step S313. When the illumination apparatuses 400 make the preliminary light emission in response to the transmission of the camera information in the step S314, the camera 100 performs the second metering operation in the step S119 in FIG. 3.

Figure 11:
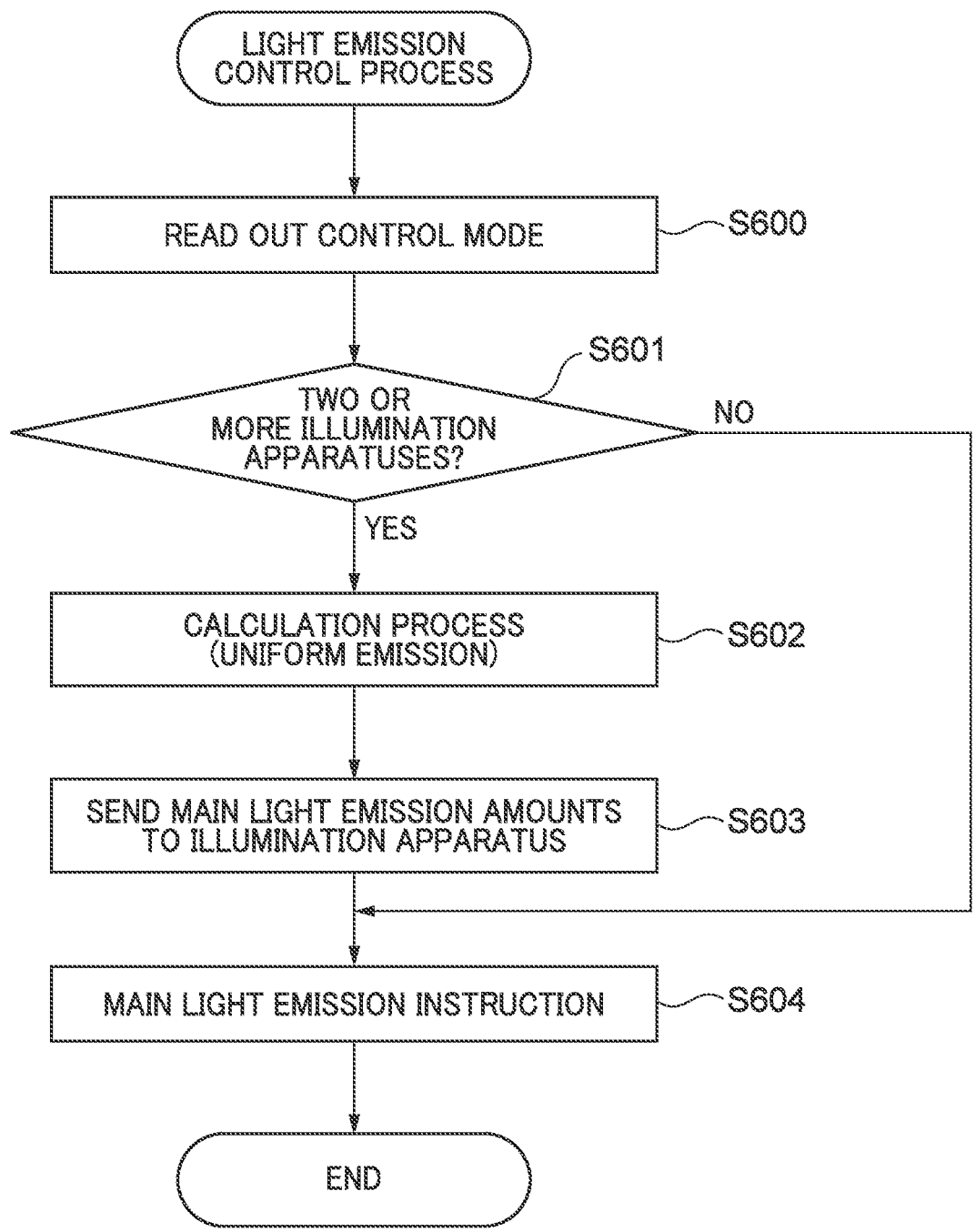
FIG. 11 is a flowchart illustrating a light emission control process.

In step S315, the control unit 301 receives the required light emission amount Y sent from the camera control unit 101 and the light emission trigger information sent in the step S123. In step S316, the control unit 301 carries out a light emission control process (FIG. 11). In the light emission control process, which will be described in detail later, the control unit 301 uses the required light emission amount Y received in the step S315 and the information received in the step S306 to determine the amount of light emission to be made by illumination apparatuses for use in the main light emission during image capturing among the illumination apparatuses 400 which are able to communicate with the control apparatus 300 (i.e., with which communication has been established by the ACC shoes 306 of the control apparatus 300 or the wireless communication unit 302 of the control apparatus 300), and sends an instruction for main light emission to the illumination apparatuses for use in the main light emission. It should be noted that the illumination apparatuses for use in the main light emission may include all of the illumination apparatuses whose communication with the control apparatus 300 has been established.

In step S317, the control unit 301 receives emission end information sent in step S414, which will be described later, from the illumination apparatuses 400 to which the instruction for main light emission was sent. Thus, the control unit 301 recognizes that the main light emission made by the illumination apparatuses 400 has completed. In step S318, the control unit 301 carries out a light emission end process in which it sends a packet, which provides notification that a sequence of steps of shooting operations using the illumination apparatuses has ended, to the camera control unit 101 and ends the process in FIG. 5.

Figure 6:
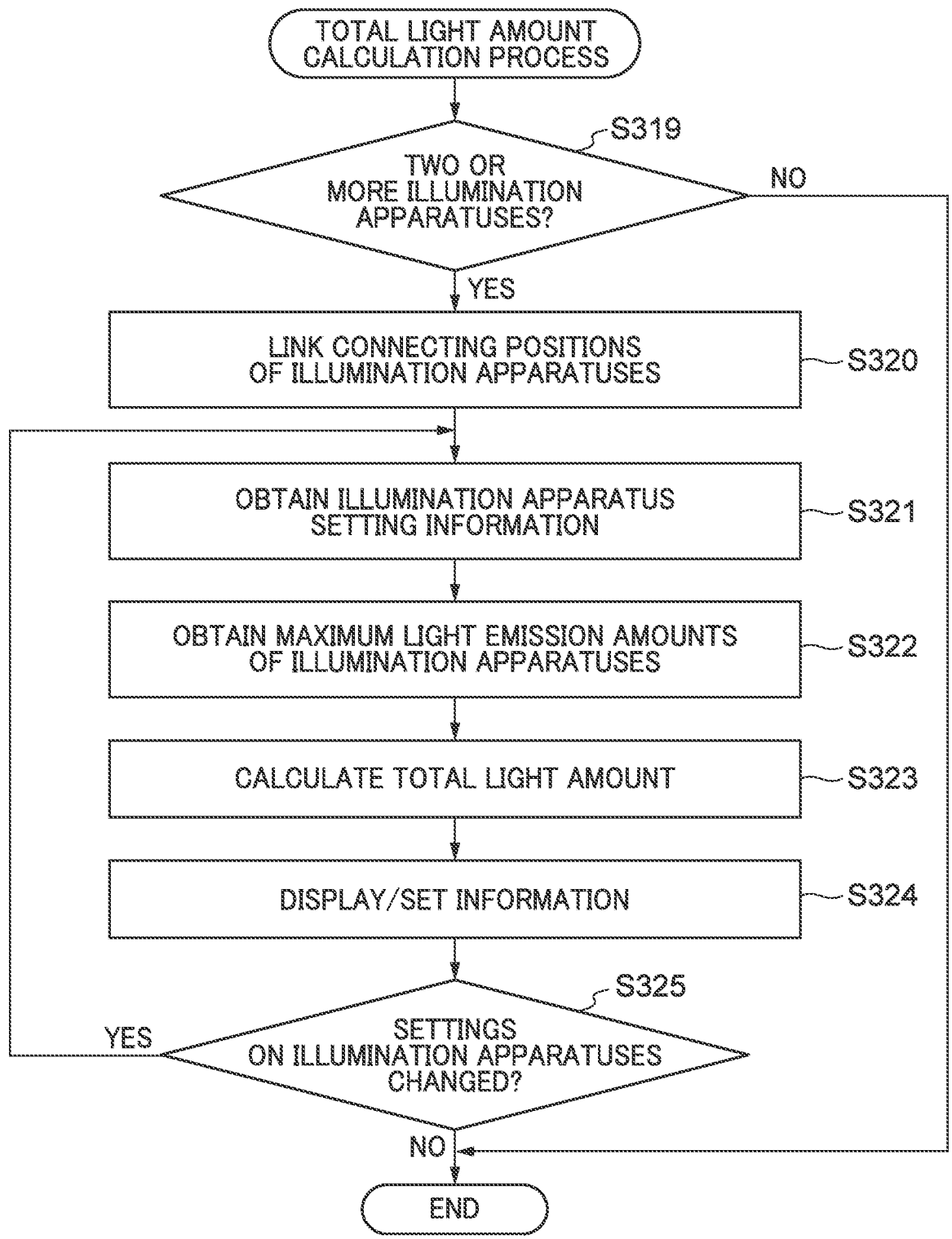
FIG. 6 is a flowchart illustrating a process of calculating a total light amount.

FIG. 6 is a flowchart illustrating the total light amount calculation process that is carried out in the step S307 in FIG. 4.

In step S319, the control unit 301 determines whether or not there are two or more illumination apparatuses with which the control unit 301 is able to communicate (whose communication with the control unit 301 has been established) via the corresponding ACC shoes 306a of the control apparatus 300 or the wireless communication unit 302 of the control apparatus 300. When there is only one illumination apparatus with which the control unit 301 is able to communicate, the control unit 301 ends the process in FIG. 6. When there are two or more illumination apparatuses which are able to communicate with the control apparatus 300, the process proceeds to step S320.

In the step S320, by storing in a memory the correlation between the illumination apparatuses 400, which were identified in the step S304 and with which the control unit 301 is able to communicate, and the corresponding ACC shoes 306a to 306d, the control unit 301 links the illumination apparatuses 400 with their connecting positions. Even when the illumination apparatuses 400 which were identified in the step S304 and with which the control unit 301 is able to communicate include illumination apparatuses whose wireless communication unit 402 has established communication with the wireless communication unit 302, the control unit 301 links such illumination apparatuses with their connecting positions by storing their communication lines (identification ports) in a memory.

In step S321, the control unit 301 obtains illumination apparatus setting information, which is setting information for the illumination apparatuses 400 being communicable with the control apparatus 300. The illumination apparatus setting information includes mode information. The mode information is setting information indicating operations performed by the illumination apparatuses 400 such as a mode in which the main light emission is made after the preliminary light emission as described above, and a mode in which the main light emission is made with a predetermined amount of light during shutter release. In step S322, the control unit 301 obtains information indicating maximum amounts of light emission (maximum light emission amounts) to be made by the respective illumination apparatuses 400 which are able to communicate with the control apparatus 300. This information was received in the step S306 in FIG. 4.

In step S323, based on the maximum light emission amounts of the respective illumination apparatuses 400, the control unit 301 uses Equation (1) to calculate a total light amount Xmax, which is a maximum light emission amount (an upper limit to the total sum of light emission amounts) made by the illumination apparatuses 400 with which communication has been established and which emit light at the same time. It should be noted that a case where there are four illumination apparatuses 400 with which communication has been established is taken as an example, and the maximum light emission amounts of the respective illumination apparatuses 400a to 400d are designated by Amax to Dmax.

Figure 9A:
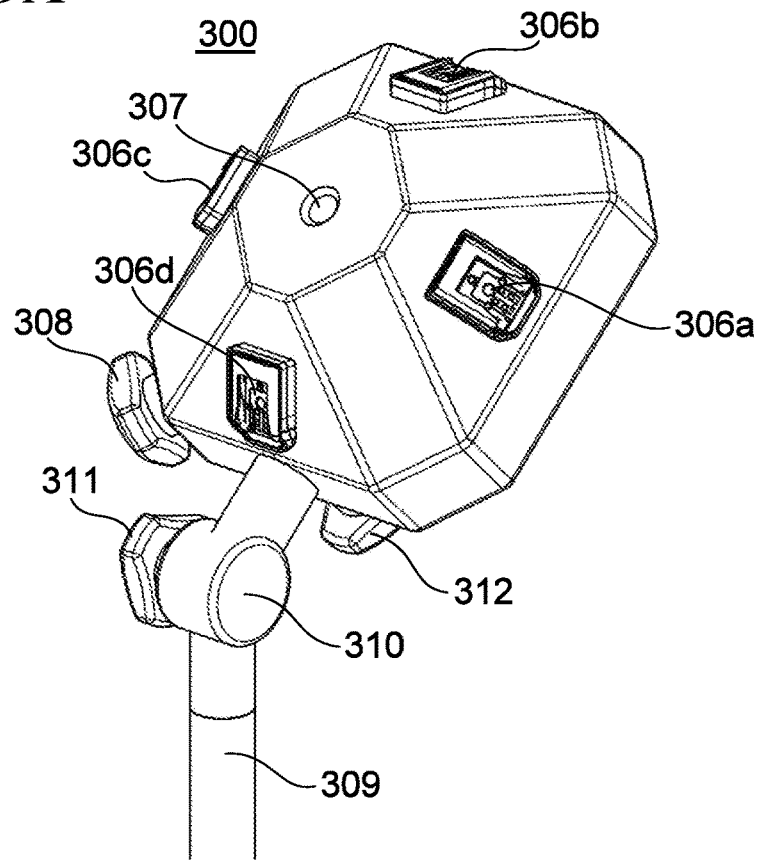
FIGS. 9A and 9B are views illustrating an appearance of a control apparatus.
Figure 9B:
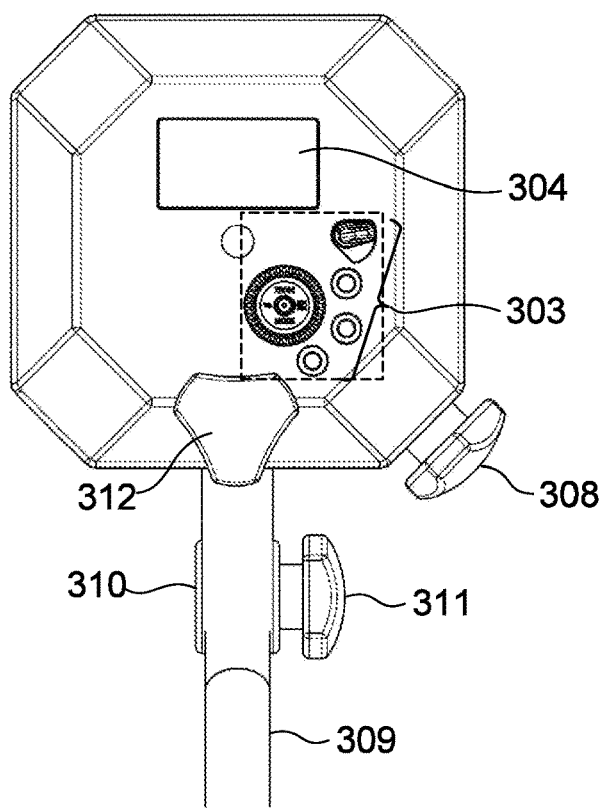

As illustrated in FIGS. 9A and 9B, which will be referred to later, it is preferred that the distances from the respective illumination apparatuses 400 to the subject are substantially uniform. The reason is that the total light amount Xmax is a total light amount calculated from the maximum light emission amounts Amax, Bmax, Cmax, and Dmax of the respective illumination apparatuses 400a to 400d with no consideration given to the positional relationship between each illumination apparatus 400 and the subject, and a difference in the distance to the subject affects the amount of light reaching the subject. However, in a case where the positional relationship between each illumination apparatus 400 and the subject has already been found through communication, differences in the distances from the illumination apparatuses 400 to the subject may be reflected on the Equation (1). For example, the differences in distance may be represented by a relational expression of Amax, Bmax, Cmax, and Dmax and applied to the Equation (1).

In step S324, the control unit 301 causes the display unit 304 of the control apparatus 300 to display the illumination apparatus setting information obtained in the steps S321 to S323 and the information indicating the total light amount Xmax. It should be noted that the information displayed on the display unit 304 may include information indicating whether or not communication via each of the ACC shoes 306a to 306d of the control apparatus 300 is possible and the linking information about the illumination apparatuses 400 obtained in the step S320.

In step S325, the control unit 301 determines whether or not the settings on the illumination apparatuses 400 which are able to communicate with the control apparatus 300 have been changed. When the control unit 301 determines that there is an illumination apparatus 400 for which the settings have been changed, the process returns to the step S321. When there is no illumination apparatus 400 for which the settings have been changed, the control unit 301 ends the process in FIG. 6.

When the control apparatus 300 has ended the total light amount calculation, the camera control unit 101 obtains information on the plurality of illumination apparatuses 400 via the control apparatus 300 (corresponding to S308). As a result, it can be regarded that one illumination apparatus whose upper limit to the light emission is the total light amount Xmax has been connected to the control apparatus 300.

In the present embodiment, in the step S308, the control unit 301 sends (outputs) the light amount information indicating the light amount obtained by adding up the maximum light emission amounts of the respective illumination apparatuses 400 whose communication with the control unit 301 has been established by the ACC shoes 306 or wireless communication unit 302 of the control apparatus 300. However, the light amount information should not always be the light amount information indicating the light amount obtained by adding up the maximum light emission amounts as long as the light amount information is obtained based on the maximum light emission amounts of the respective illumination apparatuses 400 whose communication with the control unit 301 has been established.

In the present embodiment, since the four illumination apparatuses 400 are connected to the control apparatus 300, the light amount obtained by adding up the maximum light emission amounts is approximately four times as large as the maximum light emission amount of one of the illumination apparatuses 400. However, if there are many illumination apparatuses 400 that are communicable with the control apparatus 300, the light amount obtained by adding up the $$Xmax = \sqrt{Amax^2 + Bmax^2 + Cmax^2 + Dmax^2} \qquad (1)$$

maximum light emission amounts of the respective illumination apparatuses 400 may become so large that the camera control unit 101 that has received information on such a light amount recognizes that it is error information. For example, if there are ten illumination apparatuses 400 that are communicable with the control apparatus 300, the light amount obtained by adding up their maximum light emission amounts may be approximately ten times as large as the maximum light emission amount of one illumination apparatus 400, and thus may exceed the maximum light emission amounts of the illumination apparatuses 400 expected by the camera 100. It can result in that the camera control unit 101 recognizes that the received light amount information is error information, and hence suspends shooting with the illumination apparatuses 400 making light emission. To avoid this, a predetermined upper limit may be set for light amount information sent to the camera control unit 101, i.e., light amount information indicating the total light amount obtained by adding up the maximum light emission amounts of the plurality of illumination apparatuses 400 connected to the control apparatus 300. When the total light amount obtained by adding up the maximum light emission amounts of the respective illumination apparatuses 400 is greater than the upper limit, the control unit 301 can send the upper limit as light amount information to the camera control unit 101. The upper limit may be changed according to the camera 100 on which the control apparatus 300 is mounted.

Referring to FIG. 7, a description will now be given of how the illumination apparatus 400 operates. FIG. 7 is a flowchart illustrating an illumination apparatus process which is a process performed by the illumination apparatus 400. The illumination apparatus process is implemented by a CPU provided in the illumination apparatus control unit 401 loading a program stored in a ROM into a RAM and executing the same. The illumination apparatus process is started when the illumination apparatus 400 is made operative by turning on the power to the illumination apparatus 400.

In step S401, the illumination apparatus control unit 401 initializes memories and ports. The illumination apparatus control unit 401 also reads a state of a switch input from the operating unit 403 and input information set in advance to set a flash-use shooting mode, the light amount, and other information. The information about the flash-use shooting mode, the light amount, and other information is stored in a RAM in the illumination apparatus control unit 401.

In step S402, the illumination apparatus control unit 401 starts charging a main capacitor by starting a booster circuit (which is not illustrated). In step S403, the illumination apparatus control unit 401 obtains camera information including focal length information and a light emission mode from the control apparatus 300 via the communication line (the wireless communication unit 108 of the camera 100 and the wireless communication unit 108 of the control apparatus 300). The camera information was sent in the step S305 (FIG. 4).

In step S404, the illumination apparatus control unit 401 causes the display unit 404 to display illumination apparatus information stored in the memory. In step S405, the illumination apparatus control unit 401 communicates with the control unit 301 to send the illumination apparatus information including illumination apparatus setting information for wireless communication.

In step S406, through a voltage detection circuit, the illumination apparatus control unit 401 determines whether or not the voltage boosted by the booster circuit, which is not illustrated, has reached a voltage level required for the discharge tube to emit light, that is, whether or not charging of the illumination apparatus 400 has completed. When the illumination apparatus control unit 401 determines the required voltage level has not been reached, and charging has not been completed, the process proceeds to step S407. When the illumination apparatus control unit 401 determines the required voltage level has been reached, and charging has been completed, the process proceeds to step S408.

In the step S407, the illumination apparatus control unit 401 outputs a charging incompletion signal indicating that charging has not been completed, and notifies the control unit 301 of the control apparatus 300 that the corresponding illumination apparatus 400 is not ready to emit light, followed by the process returning to the step S402. On the other hand, in the step S408, the illumination apparatus control unit 401 outputs a charging completion signal indicating that charging has been completed, and notifies the control unit 301 of the control apparatus 300 that the illumination apparatus 400 is ready to emit light.

In step S409, the illumination apparatus control unit 401 checks a charging state to determine whether or not the charging level is equal to or lower than a threshold value. When the charging level is equal to or lower than the threshold value, the process returns to the step S402, in which the illumination apparatus control unit 401 starts recharging. On the other hand, when the illumination apparatus control unit 401 determines that the charging level is higher than the threshold value, the process proceeds to step S410. In the step S410, based on information from the camera 100, the illumination apparatus control unit 401 determines whether or not SW2 that issues an instruction to start shooting has been turned on. When the illumination apparatus control unit 401 determines that SW2 is off, the process returns to the step S409. When the illumination apparatus control unit 401 determines that SW2 has been turned on, the process proceeds to step S411.

In the step S411, on condition that a start signal for preliminary light emission has been sent, the illumination apparatus control unit 401 carries out a preliminary light emission communication using the corresponding illumination apparatus 400. First, the illumination apparatus control unit 401 determines whether or not information on preliminary light emission communication (including a start signal for preliminary light emission) was output/sent from the control unit 301 in the step S314 in FIG. 5. When the start signal for preliminary light emission was output/sent from the control unit 301, the illumination apparatus control unit 401 carries out the preliminary light emission communication using the illumination apparatus 400. In response to this, the camera control unit 101 performs the second metering operation in the step S119 in FIG. 3.

In step S412, the illumination apparatus control unit 401 receives light amount setting information sent from the control unit 301. The light amount setting information indicates main light emission amounts (light emission amounts A to D), in other words, the light emission amounts of illumination apparatuses 400 for use in the main light emission. The light amount setting information is sent from the control unit 301 in step S603 in a light emission control process (FIG. 11), which will be described later.

Figure 8:
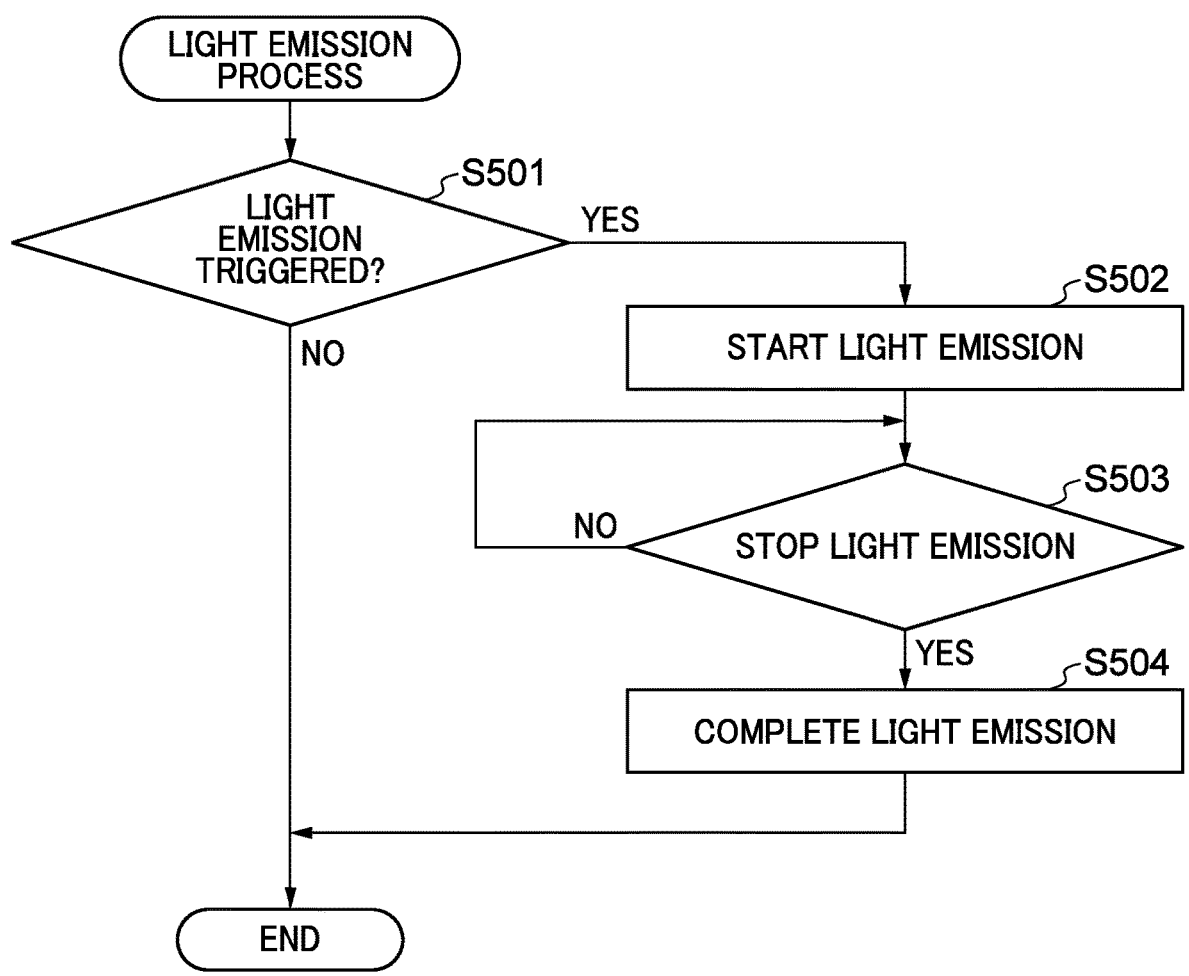
FIG. 8 is a flowchart illustrating a light emission process.

In step S413, the illumination apparatus control unit 401 carries out a main light emission process (FIG. 8). Thus, on condition that a start signal for an illumination apparatus (light emission trigger information) was sent, the illumination apparatus 400 is caused to make the main light emission.

In step S414, the illumination apparatus control unit 401 carries out a light emission end process, in which it sends a packet, which notifies the control unit 301 that a sequence steps of the flash-use shooting operation has ended, as emission end information, and ends the process in FIG. 7.

FIG. 8 is a flowchart illustrating the light emission process. The light emission process is carried out in the step S411 or the step S413. The light emission process is a preliminary light emission process when it is carried out in the step S411, and is a main light emission process when it is carried out in the step S413.

In step S501, through the control unit 301, the illumination apparatus control unit 401 determines whether or not the light emission trigger signal, which is the start signal for light emission, has been sent from the camera control unit 101. When the illumination apparatus control unit 401 determines that the light emission trigger signal has not been sent from the camera control unit 101, the process in FIG. 8 is ended. On the other hand, when the illumination apparatus control unit 401 determines that the light emission trigger signal has been sent from the camera control unit 101, the process proceeds to step S502.

In the step S502, the illumination apparatus control unit 401 carries out a process of starting light emission. In step S503, the illumination apparatus control unit 401 continues light emission until an emission stop condition is satisfied. That is, the illumination apparatus control unit 401 monitors whether or not the light emission amount has reached a predetermined light emission amount (for example, the main light emission amount received in the step S412 or the preliminary light emission amount, which will be described later), and when the light emission amount has reached the predetermined light emission amount, the illumination apparatus control unit 401 determines that the emission stop condition is satisfied. To make the determination, first, the illumination apparatus control unit 401 causes a photodiode, which is not illustrated, to receive light from the discharge tube directly or through a glass fiber. Then, the illumination apparatus control unit 401 causes an integrator circuit to integrate the currents of the light received by the photodiode so that the predetermined light emission can be achieved. It should be noted that the preliminary light emission amount may be set to a small value such as 1/32 of the maximum light emission amount, and the main light emission output may be set to a relative value of the preliminary light emission amount.

In step S504, the illumination apparatus control unit 401 stops light emission by outputting a stop signal for light emission and ends the process in FIG. 8.

FIGS. 9A and 9B are external views of the control apparatus 300. The control apparatus 300 is equipped with, for example, four ACC shoes 306, and the ACC shoes 306a to 306d are disposed at regular intervals around a mounting hole 307. An umbrella fixing screw 308 is used for fixing an axial portion of an umbrella, a diffuser, or another device to the mounting hole 307. The control apparatus 300 can be installed with a stand unit 309, and its posture can be changed with a movable unit 310. The movable unit 310 is fixed by a vertical angle fixing screw 311 and a rotation fixing screw 312 after a light emission direction is determined. As illustrated in FIG. 9B, the operating unit 303 and the display unit 304 are disposed on the opposite side of the ACC shoes 306a to 306d.

Figure 10:
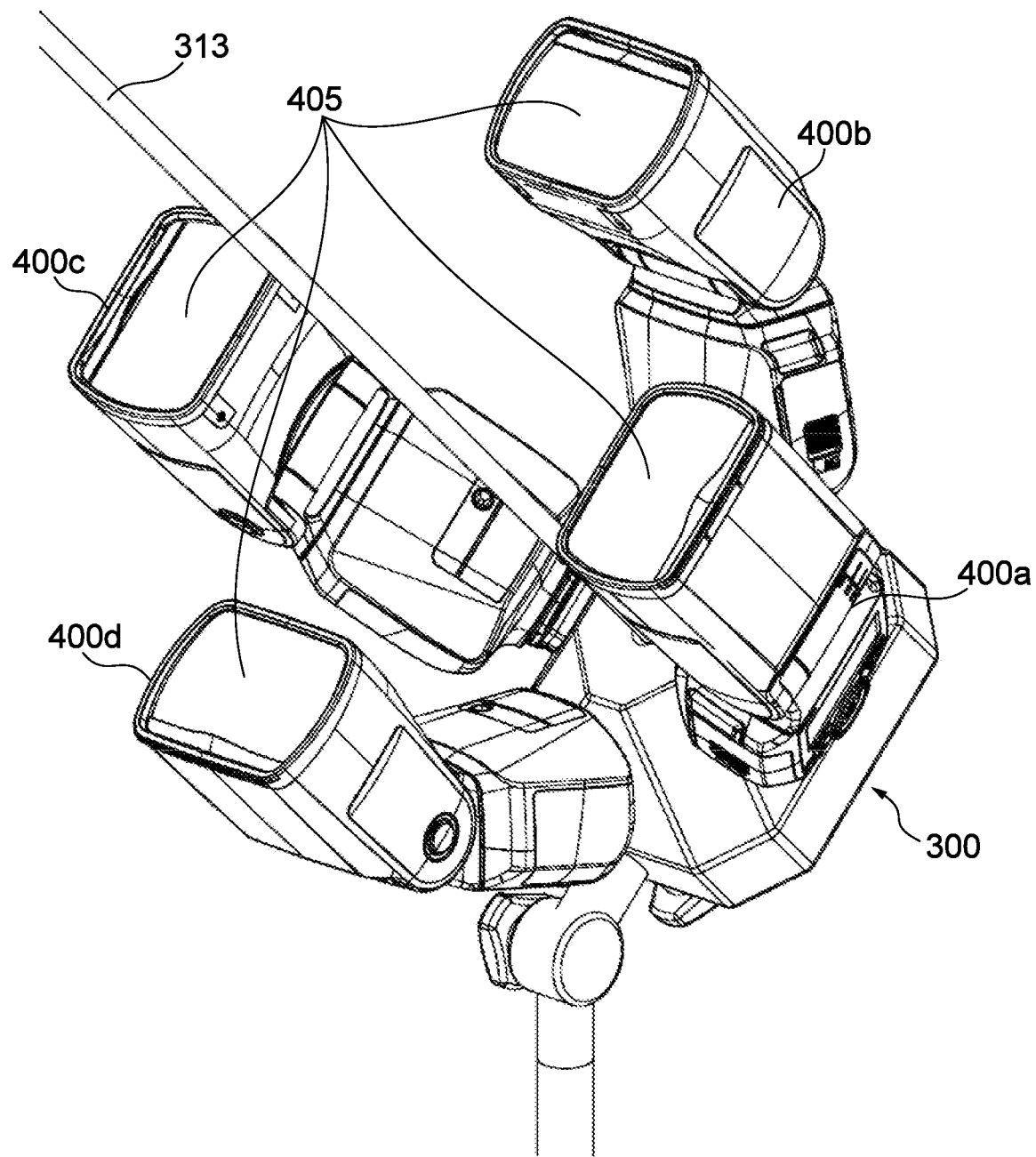
FIG. 10 is an external view of the control apparatus.

FIG. 10 is a perspective view of the control apparatus 300 on which the plurality of illumination apparatuses 400 is mounted. For ease of explanation, it is assumed that the illumination apparatuses 400a to 400d are connected to the respective ACC shoes 306a to 306d of the control apparatus 300. When the four illumination apparatuses 400a to 400d are mounted on the control apparatus 300, the flash units 405 can be oriented in the same direction by setting the vertical bounce angle of the illumination apparatuses 400a to 400d to 45 degrees. In the state illustrated in FIG. 10, all of the illumination apparatuses 400a to 400d are able to emit light in the axial direction of an umbrella axial portion 313.

FIG. 11 is a flowchart illustrating the light emission control process that is carried out in the step S316 in FIG. 5. Here, light emission control mode is set for the control apparatus 300, and a "uniform emission mode (first mode)" or a "sequential emission mode (second mode)" is set to the light emission control mode. The light emission control mode is stored in the memory 320 in the control apparatus 300.

The uniform emission mode is a mode in which the illumination apparatuses 400 for use in the main light emission are caused to emit light all at once (at the same time), and in particular, a mode in which the light emission amounts of the illumination apparatuses 400 are made uniform (equalized). The illumination apparatuses 400 for use in the main light emission may include all of the illumination apparatuses 400 whose communication with the control apparatus 300 has been established. The sequential emission mode is a mode in which among the illumination apparatuses 400 whose communication with the control apparatus 300 has been established, at least one illumination apparatus 400 determined based on predetermined sequence information is caused to emit light for the main light emission. The light emission control mode is set for the control apparatus 300 by a user. In the present embodiment described below, it is assumed that the uniform emission mode is set to the light emission control mode.

In the present embodiment, the uniform emission mode is set, and therefore, when the shutter button of the camera 100 is pressed all the way down, the control apparatus 300 causes the illumination apparatuses 400, which are ready to emit light, to emit light at the same time and control their respective light amounts to be equalized.

In step S600, the control unit 301 reads the light emission mode set for the control apparatus 300 (or information indicating whether the light emission control mode is set to "the uniform emission mode" or "the sequential emission mode") from the memory 320 to confirm that the "uniform light emission mode" is set to the light emission control mode. In step S601, the control unit 301 determines whether or not there are two or more illumination apparatuses 400 which are able to communicate (communication has been established) with the control apparatus 300 via the ACC shoes 306 of the control apparatus 300 or the wireless communication unit 302 of the control apparatus 300. When there is only one illumination apparatus 400 which is able to communicate with the control apparatus 300, the process proceeds to step S604. When there are two or more illumination apparatuses 400 which are able to communicate with the control apparatus 300, the process proceeds to step S602. Here, for example, it is assumed that the four illumination apparatuses 400a to 400d are able to communicate with the control apparatus 300.

In the step S602, based on the required light emission amount Y and the light emission trigger information as well as the charging completion signal or the charging incompletion signal, the control unit 301 carries out a calculation process for determining the light emission amounts of the respective illumination apparatuses 400a to 400d. The required light emission amount Y and the light emission trigger information were received from the camera 100 in the step S315. The charging completion signal or the charging incompletion signal was sent from the illumination apparatuses 400 in the step S408 and received in the step S310.

Since the light emission control mode is the uniform emission mode, the control unit 301 calculates the main light emission amounts of the respective illumination apparatuses 400a to 400d in the step S602 such that when the illumination apparatuses 400a to 400d emit light uniformly at the same time, the total light emission amount is close to the required light emission amount Y. For example, the control unit 301 calculates the main light emission amounts of the respective illumination apparatuses 400a to 400d such that the total light emission amount matches the required light emission amount Y.

Specifically, the control unit 301 determines the main light emission amounts of the respective illumination apparatuses 400a to 400d such that Equations (2) and (3) below are satisfied. The main light emission amounts of the respective illumination apparatuses 400a to 400d are designated by A to D. It should be toned that the main light emission amounts A to D are set within such ranges that they do not exceed the respective maximum light emission amounts Amax to Dmax.

$$Y=\sqrt{A^2+B^2+C^2+D^2} \qquad (2)$$

$$A=B=C=D \qquad (3)$$

In step S603, the control unit 301 sends light amount setting information indicating the main light emission amounts A to D determined in the step S602 to the respective illumination apparatuses 400a to 400d for which it was determined in the step S310 in FIG. 5 that charging had been completed.

In step S604, the control unit 301 instructs the illumination apparatuses 400, which are able to communicate with the control apparatus 300, to make the main light emission. For example, in the case where the process went through the step S603, the illumination apparatuses 400a to 400d are instructed to make the main light emission. It should be noted that in response to this, the illumination apparatuses 400a to 400d make the main light emission in the same manner as in the step S413 in FIG. 7.

According to the present embodiment, the control unit 301 of the control apparatus 300 communicates with the camera control unit 101 of the camera 100 and sends (outputs) the light amount information, which is obtained by adding up the light emission amounts of the plurality of illumination apparatuses 400 connected to the control apparatus 300, to the camera control unit 101. The control unit 301 obtains the required light emission amount Y required for image capturing by the camera 100 working as an imaging unit (step S315), and determines the main light emission amounts of the respective illumination apparatuses 400 according to the required light emission amount Y and communication information on the plurality of illumination apparatuses 400. That is, based on the required light emission amount Y, the control unit 301 determines the light emission amounts A to D of the illumination apparatuses 400 for use in the main light emission during image capturing among the illumination apparatuses 400 whose communication with the control apparatus 300 has been established (step S602). Then, the control unit 301 controls the illumination apparatuses 400 such that they emit light with the determined light emission amounts A to D (steps S603 and S604). As a result, when the camera 100 captures an image of a subject using the plurality of illumination apparatuses 400, illumination of the subject with insufficient light in the main light emission is prevented.

For example, the control unit 301 determines the main light emission amounts of the respective illumination apparatuses 400 such that the total of the light emission amounts A to D of the illumination apparatuses 400 for use in the main light emission matches the required light emission amount Y and causes those illumination apparatuses 400 to emit light all at once. Particularly in the uniform emission mode, the control unit 301 equalizes the light emission amounts of the respective illumination apparatuses 400 and causes them to emit light at the same time. Thus, it is easy to control the light emission of the plurality of illumination apparatuses 400 artificially as a single illumination apparatus and achieve the light emission amount required for shooting.

As a result, the light emission amount of each illumination apparatus 400 in every shooting action can be reduced, and hence heating of the discharge tube, the reflective umbrella, and other components constituting the flash unit 405 can be suppressed. By reducing the light emission amounts, the amount of battery consumption in the illumination apparatuses 400 can be reduced, and degradation of the illumination apparatuses 400 and batteries can be prevented.

Moreover, through the medium of the control apparatus 300, the camera 100 is able to substantially wirelessly communicate with an illumination apparatus equipped with no wireless function as well.

In the present embodiment, there are four illumination apparatuses determined as those capable of making the main light emission. It should be noted that the number of illumination apparatuses determined as those capable of making the main light emission can be two or more as long as the main light emission amount of respective illumination apparatuses are calculated so as to satisfy the Equations (2) and (3).

In the present embodiment, it is assumed that the maximum light emission amounts Amax to Dmax of the respective four illumination apparatuses 400 are the same, and the light emission amounts of the respective illumination apparatus 400 are the same so as to satisfy the Equation (3), which are not essential. In a case where there are illumination apparatuses 400 whose maximum light emission amounts are different, the ratio among the main light emission amounts of the respective illumination apparatuses 400 may be determined according to the ratio among the maximum light emission amounts of the respective illumination apparatuses 400 instead of the Equation (3).

It should be noted that even when the illumination apparatuses 400 whose maximum light emission amounts are the same, their main light emission amount should not necessarily be the same.

Second Embodiment

In the first embodiment, it is assumed that the uniform emission mode is set to the light emission control mode. On the other hand, in a second embodiment of the present invention described below, the "sequential emission mode" is set to the light emission control mode. As a light emission control process, a process in FIG. 12 is adopted instead of the process in FIG. 11 unlike the first embodiment.

In the sequential emission mode, every time the shutter button of the camera 100 is pressed all the way down, the control apparatus 300 changes at least one illumination apparatus 400 for use in the main light emission this time (current main light emission) among the plurality of illumination apparatuses 400a to 400d which are able to communicate with the control apparatus 300. For example, the control apparatus 300 causes the illumination apparatuses 400a to 400d to emit light one by one in a predetermined order every time the shutter button is pressed all the way down.

Figure 12:
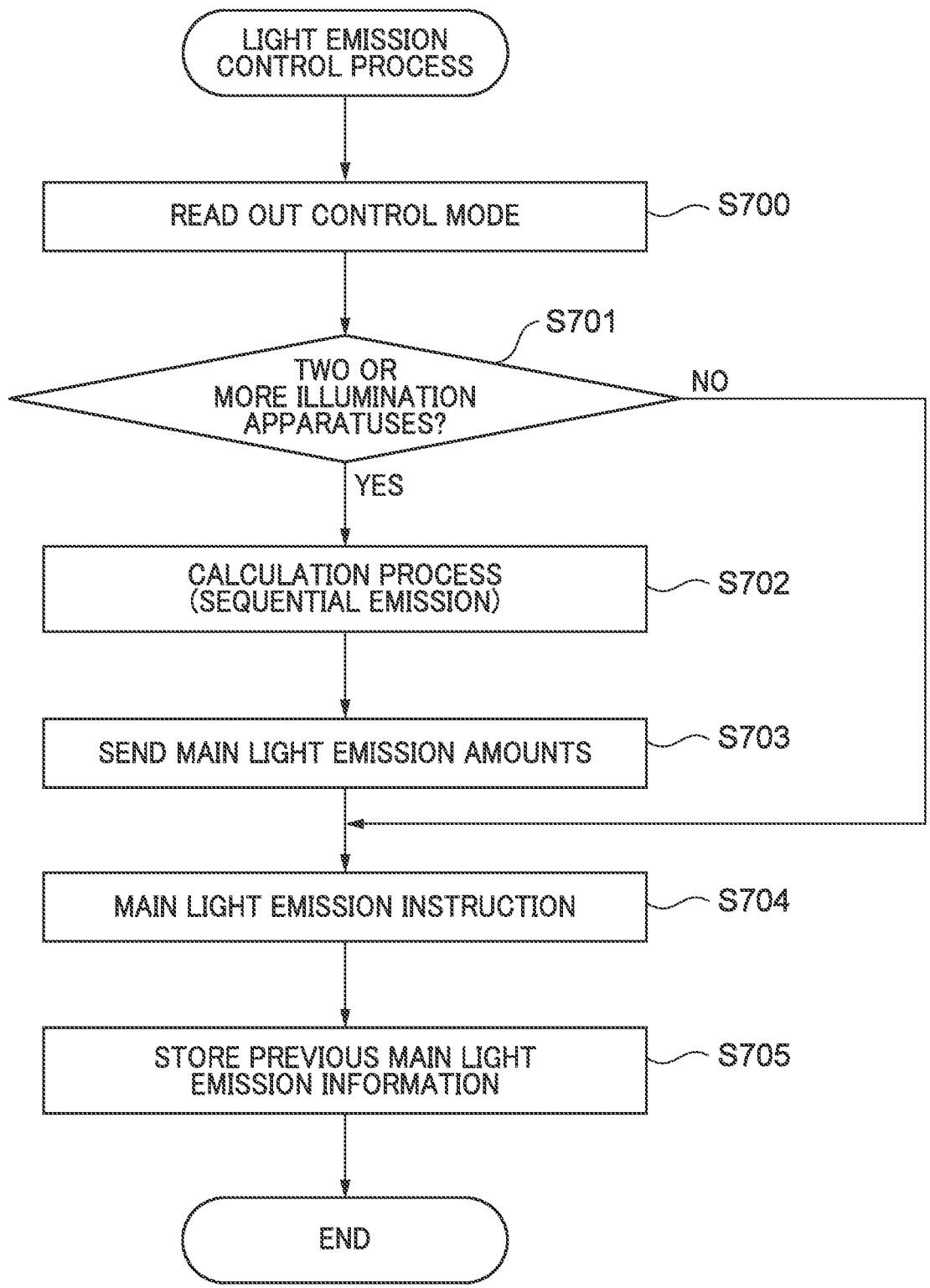
FIG. 12 is a flowchart illustrating a light emission control process.

FIG. 12 is a flowchart illustrating the light emission control process that is carried out in the step S316 in FIG. 5.

In S700, the control unit 301 reads the light emission control mode set for the control apparatus 300 and confirms that it is the sequential emission mode. In step S701, the control unit 301 carries out the same process as in the step S601. Here, for example, it is assumed that the four illumination apparatuses 400a to 400d are able to communicate with the control apparatus 300.

In step S702, as with the step S602, the control unit 301 carries out a calculation process for determining the light emission amounts of the respective illumination apparatuses 400a to 400d for use in the main light emission. However, since the light emission control mode is the sequential emission mode, the control unit 301 identifies at least one illumination apparatus 400 for use in the current light emission based on sequence information and determines the light emission amount of the at least one identified illumination apparatus 400 in the step S702. In the present embodiment, only one illumination apparatus for use in the current main light emission is identified. Here, the sequence information is set by a user and stored in the memory 320 of the control apparatus 300. The illumination apparatus 400 next to the illumination apparatus 400 used in the previous main light emission (stored in S705, which will be described later) is identified as the illumination apparatus for use in the current main light emission. When, for example, the identified illumination apparatus 400 is the illumination apparatus 400b, the main light emission amount of the illumination apparatus 400b is calculated such that it matches the required light emission amount Y. In step S703, the control unit 301 sends light amount setting information indicating the main light emission amount determined in the step S702 to the identified illumination apparatus 400.

In step S704, the control unit 301 instructs the identified illumination apparatus 400 to make the main light emission. It should be noted that the light emission action of the illumination apparatus 400 in response to the instruction is the same as the light emission action in the step S413 in FIG. 7.

In step S706, the control unit 301 stores information indicating the illumination apparatus 400 instructed to make the main light emission (used in the current main light emission) in the memory 320 and ends the process in FIG. 12. When the shutter button is pressed all the way down (SW2) next time, the stored information indicating the illumination apparatus 400 is used in determining which illumination apparatus 400 is identified as the illumination apparatus 400 for use in the current light emission. For example, in a case where the illumination apparatus 400a is identified as the illumination apparatus 400 for use in the main light emission in response to the first turning-on of the SW2, the illumination apparatus 400b is identified as the illumination apparatus 400 for use in the main light emission in response to the second turning-on of the SW2. As a result, the illumination apparatuses 400 which are able to communicate with the control apparatus 300 are sequentially used in the main light emissions.

As described above, in the sequential emission mode, the illumination apparatuses 400 which are able to communicate with the control apparatus 300 are sequentially caused to emit light every time SW2 is turned on, and hence there is enough time for charging each of the illumination apparatuses 400. Thus, the same effect can be achieved as the effect achieved by artificially using only one illumination apparatus 400 that can be charged at high speed. This can reduce phenomena in which the illumination apparatuses 400 cannot be charged in time when pictures are sequentially taken in a short period of time. For example, in a case where the illumination apparatuses 400a to 400d are charged at the same charging speed, the time required for charging can be artificially reduced to one fourth.

Thus, according to the present embodiment, the same effect can be achieved as in the first embodiment in terms of preventing illumination with insufficient light in the main light emission.

It should be noted that although in the present embodiment, there are four illumination apparatuses which are able to communicate with the control apparatus 300, the number of illumination apparatuses 400 for use in the main light emission has only to be two or more insofar as they satisfy a light emission sequence determined in advance.

It should be noted that the first embodiment and the second embodiment may be combined together. For example, control may be varied depending on whether the light emission control mode is the uniform emission mode or the sequential emission mode. In this case, when the light emission control mode read out in the step S600 in FIG. 11 is the uniform emission mode, the control unit 301 may carry out a process corresponding to the steps S601 to S604. Likewise, when the light emission control mode read out in the step S600 in FIG. 11 is the sequential emission mode, the control unit 301 may carry out a process corresponding to the steps S701 to S705.

It should be noted that in the second embodiment, it is assumed that one illumination apparatus 400 determined by the sequence is identified as the illumination apparatus 400 for use in the current main light emission. However, two or more illumination apparatuses 400 may be identified as the illumination apparatuses 400 for use in the current main light emission. In this case, the plurality of illumination apparatuses 400 is divided into a plurality of groups each comprised of two or more illumination apparatuses 400 in advance, and sequence information is set on a group-by-group basis. The grouping information and the sequence information are stored in the memory 320 of the control apparatus 300.

Then, the control unit 301 identifies a group for use in the current main light emission among the groups to which the illumination apparatuses 400 whose communication with the control apparatus 300 has been established belong. For example, the illumination apparatuses 400 attached to the ACC shoes 306a and 306b of the control apparatus 300 belong to the first group, and the illumination apparatuses 400 attached to the ACC shoes 306c and 306d of the control apparatus 300 belong to the second group. In this case, the main light emission amounts of the illumination apparatuses 400a and 400b belonging to the first group and the main light emission amounts of the illumination apparatuses 400c and 400d belonging to the second group are calculated such that they satisfy Equations (4), (5), and (6) below using the required light emission amount Y. It should be noted that the main light emission amounts of the illumination apparatuses 400c and 400d are designated by A, B, C, and D, respectively.

$$Y=\sqrt{A^2+B^2}=\sqrt{C^2+D^2} \quad (4)$$

$$A=B \quad (5)$$

$$C=D \quad (6)$$

Therefore, the sum totals of the main light emission amounts in the respective groups are the same. These sum totals, however, should not necessarily be the same. The main light emission amounts of the illumination apparatuses 400 belonging to the same group are the same. These main light emission amounts, however, should not necessarily be the same.

As a result of the control described above, the effect of the first embodiment can be achieved in terms of easily achieving the required light emission amount by controlling the light emission of the plurality of illumination apparatuses 400 in the same group artificially as one illumination apparatus 400. Moreover, by sequentially changing the groups for use in the main light emission every time SW is turned on, the effect of the second embodiment can be achieved in terms of artificially reducing the time required for charging.

Third Embodiment

Figure 13:
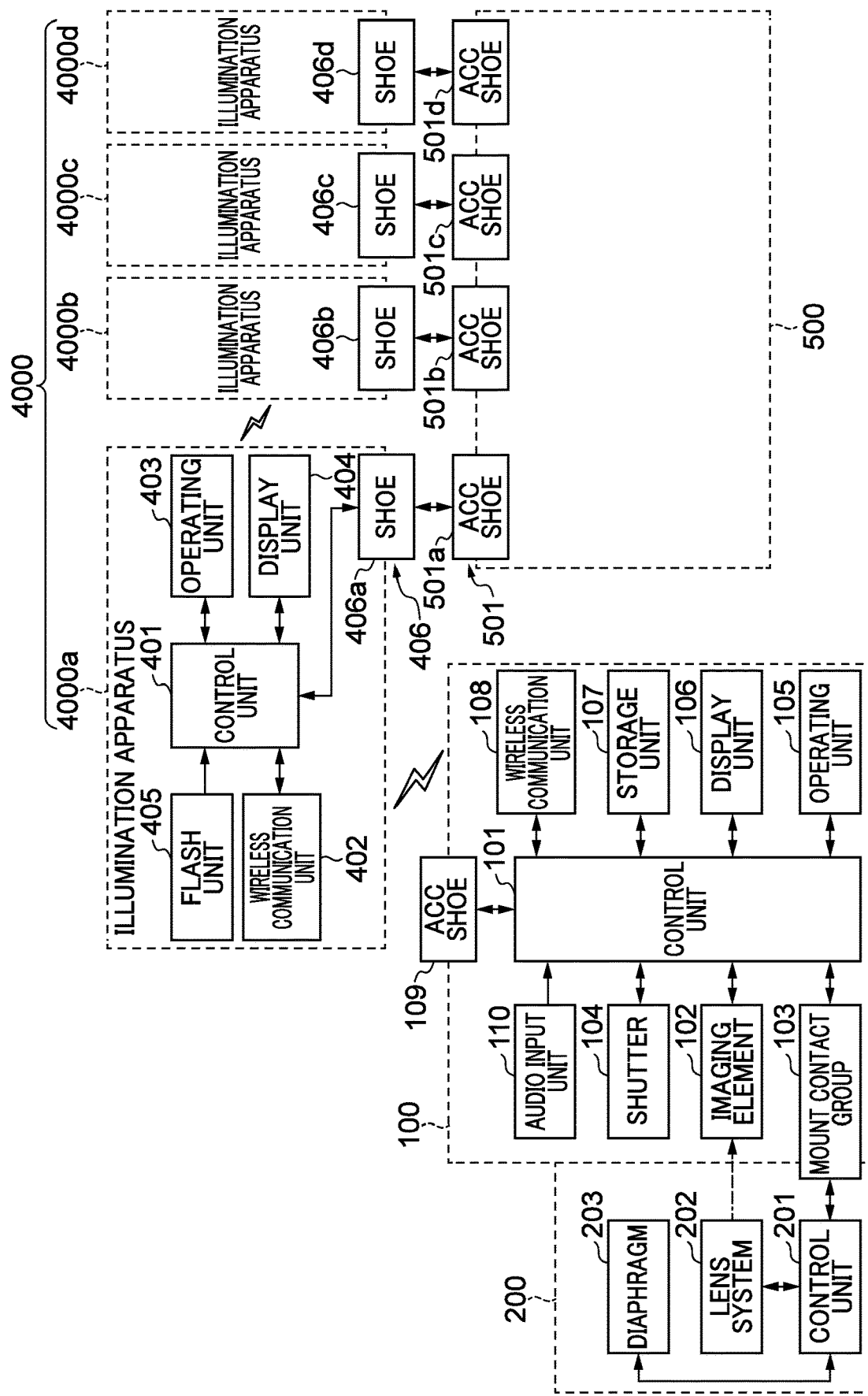
FIG. 13 is a block diagram illustrating an overall configuration of the imaging system.

FIG. 13 is a block diagram illustrating an overall configuration of an imaging system in which an illumination control apparatus according to the third embodiment is used. This imaging system (illumination control system) includes a stand 500 and a plurality of illumination apparatuses 4000 as well as the camera 100 and the shooting lens 200. In the present embodiment, the imaging system includes, for example, four illumination apparatuses 4000*a* to 4000*d*. In FIG. 13, the same component elements as those in the first embodiment are designated by the same reference symbols.

In the first and second embodiments, the processes relating to light emission control (FIGS. 4 to 6, FIG. 11, FIG. 12) are carried out by the control unit 301 provided in the control apparatus 300. On the other hand, in the present embodiment, a control unit that carries out processes relating to light emission control is provided in one or all of the illumination apparatuses 4000*a* to 4000*d*. In the example illustrated in FIG. 13, the illumination apparatus 4000*a* functions as an illumination apparatus and also functions as the control apparatus 300 in the first embodiment.

The stand 500 is capable of holding the plurality of illumination apparatuses 4000*a* to 4000*d* at a location away from the camera 100 and used to perform clip-on shooting. The illumination apparatuses 4000*a* to 4000*d* are connected to ACC shoes (accessory shoes) 501. In the present embodiment, the stand 500 is equipped with, for example, four ACC shoes 501*a* to 501*d*. The illumination apparatuses 4000*a* to 4000*d* can be fixed to the respective ACC shoes 501*a* to 501*d* of the stand 500 via their respective shoes (or shoe mounting feet) 406*a* to 406*d*. The ACC shoes 501*a* to 501*d* have the same configuration. Although in the present embodiment, the ACC shoes 501 are provided at the four locations, there can be any number of ACC shoes 501.

The illumination apparatuses 4000*a* to 4000*d* have the same configuration. Thus, a description will now be given of the configuration of the illumination apparatus 4000*a* as a typical example. The illumination apparatus 4000*a* is equipped with an illumination apparatus control unit 401 as a microcomputer that includes, for example, one or more processors incorporated therein to control the operation of components of the illumination apparatus 4000*a*. The illumination apparatus control unit 401, a wireless communication unit 402, an operating unit 403, a display unit 404, and a flash unit 405 have the same configurations and functions as those of the corresponding component elements of the illumination apparatus 400 (refer to the first embodiment).

The illumination apparatus control unit 401 is configured to carry out wireless communications with wireless communication units of respective external illumination apparatuses such as the illumination apparatuses 4000*a* to 4000*d*. For example, the wireless communication unit 402 is capable of receiving an instruction for light emission from the camera 100 and sending and receiving camera information, illumination apparatus information, and other information. The wireless communication unit 402 is also configured to send and receive control signals relating to shooting such as a shooting start command and a shooting end command as well as other information.

After the shutter button is pressed all the way down (turning-on of SW2) in the step S115 in FIG. 2, the illumination apparatus control unit 401 communicates with illumination apparatus control units, which is not illustrated, provided in the illumination apparatuses 4000*b* to 4000*d*. Thus, the illumination apparatus control unit 401 carries out the processes in FIGS. 4 to 6, FIG. 11, and FIG. 12, in which it determines the light emission amounts and light emission timing of the illumination apparatuses 4000*a* to 4000*d* and causes the illumination apparatuses 4000*a* to 4000*d* to make the main light emission.

As described above, in the present embodiment, the illumination control apparatus according to one aspect of the present invention is implemented by one illumination apparatus 4000*a* among the plurality of illumination apparatuses 4000, and the illumination control apparatus itself serves as an illumination apparatus for use in the main light emission. The wireless communication unit 402 is capable of wirelessly communicating with the camera 100 and the illumination apparatuses 4000*b* to 4000*d*. The illumination apparatus 4000*a* determines the light emission amounts of an illumination apparatuses for use in the main light emission among itself (the illumination apparatus 4000*a*) and the illumination apparatuses whose communication with the control apparatus 300 has been established based on the required light emission amount Y.

According to the present embodiment, the same effect can be achieved as in the first embodiment in terms of preventing illumination with insufficient light in the main light emission. In particular, since the functions of the control apparatus 300 in the first embodiment for carrying out the processes relating to light emission control are provided in the illumination apparatus 4000*a*, the number of devices for use in shooting can be reduced.

It should be noted that in the present embodiment, there may be a plurality of illumination apparatuses that carry out the processes relating to light emission control, and one of them may actually carry out the processes relating to light emission control.

It should be noted that the same effect can be achieved even by providing the camera control unit 101 with the functions for carrying out the processes relating to light emission control. That is, the camera 100 may be provided with the functions which the control apparatus 300 according to the first embodiment has. In this case, the camera 100 serves as an imaging apparatus equipped with an imaging unit, which includes the imaging element 102 and others and is configured to capture an image of a subject, and the illumination control apparatus.

It should be noted that in the present embodiment, the light emission control mode may be either the uniform emission mode or the sequential emission mode, or the light emission control mode may be changeable.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2022-016472 filed on Feb. 4, 2022 which is hereby incorporated by reference herein in its entirety.

What is claimed is:

1. An illumination control apparatus that controls a plurality of illumination apparatuses for use in image capturing by an imaging unit, the illumination control apparatus comprising:
   a communication unit that is communicable with the plurality of illumination apparatuses; and
   at least one processor configured to perform operations of:
      outputting light amount information based on maximum light emission amounts of illumination apparatuses with which communication has been established by the communication unit among the plurality of illumination apparatuses;
      obtaining a required light emission amount indicating a light emission amount required for image capturing by the imaging unit;
      based on the required light emission amount, determining light emission amounts of illumination apparatuses for use in main light emission during image capturing among the illumination apparatuses with which communication has been established by the communication unit; and
      controlling the illumination apparatuses for use in the main light emission to emit light with the determined light emission amounts,
   wherein the at least one processor is configured to perform further operations of:
   outputting, as the light amount information, information indicating a predetermined upper limit in a case where a total light amount obtained by adding up the maximum light emission amounts of the illumination apparatuses with which communication has been established by the communication unit is greater than the upper limit.

2. The illumination control apparatus according to claim 1,
   wherein the at least one processor is configured to perform further operations of:
   when controlling the illumination apparatuses for use in the main light emission, causing the illumination apparatuses for use in the main light emission to emit light all at once.

3. The illumination control apparatus according to claim 2,
   wherein the at least one processor is configured to perform further operations of:
   when determining the light emission amounts of the illumination apparatuses for use in the main light emission, equalizing the light emission amounts of the illumination apparatuses for use in the main light emission.

4. The illumination control apparatus according to claim 1,
   wherein the at least one processor is configured to perform further operations of:
   determining the light emission amounts of the illumination apparatuses for use in the main light emission such that a total light amount obtained by adding up the light emission amounts of the illumination apparatuses for use in the main light emission matches the required light emission amount.

5. The illumination control apparatus according to claim 1,
   wherein the illumination apparatuses for use in the main light emission include all of the illumination apparatuses with which communication has been established by the communication unit.

6. The illumination control apparatus according to claim 1,
   wherein the at least one processor is configured to perform further operations of:
   identifying at least one illumination apparatus for use in current main light emission among the illumination apparatuses with which communication has been established by the communication unit, based on predetermined sequence information, and
   determining a light emission amount of the at least one illumination apparatus.

7. The illumination control apparatus according to claim 6,
   wherein the at least one processor is configured to perform further operations of:
   identifying just one illumination apparatus for use in the current main light emission.

8. The illumination control apparatus according to claim 6, further comprising a memory,
   wherein the at least one processor is configured to perform further operations of:

storing information indicating illumination apparatuses used in the current main light emission in the memory, and based on information indicating illumination apparatuses used in previous main light emission, identifying the at least one illumination apparatus for use in the current main light emission.

9. The illumination control apparatus according to claim 6, wherein the plurality of illumination apparatuses is divided into a plurality of groups each including two or more illumination apparatuses, and wherein the at least one processor is configured to perform further operations of:

identifying a group for use in the current main light emission among groups to which the illumination apparatuses with which communication has been established by the communication unit belong in the plurality of groups.

10. The illumination control apparatus according to claim 9, wherein the at least one processor is configured to perform further operations of:

when determining the light emission amounts of the illumination apparatuses for use in the main light emission, equalizing light emission amounts of illumination apparatuses belonging to a same group among the illumination apparatuses for use in the main light emission.

11. The illumination control apparatus according to claim 1, wherein the at least one processor is configured to perform further operations of:

obtaining a light emission control mode to which a first mode or a second mode is set;

causing the illumination apparatuses for use in the main light emission to emit light all at once in a case where the light emission control mode is set to the first mode, and causing at least one illumination apparatus, which is determined based on predetermined sequence information among the plurality of illumination apparatuses, to emit light in a case where the emission control mode is set to the second mode.

12. The illumination control apparatus according to claim 1, wherein the at least one processor is configured to perform further operations of:

outputting, as the light amount information, information indicating a total light amount obtained by adding up the maximum light emission amounts of the illumination apparatuses with which communication has been established by the communication unit.

13. The illumination control apparatus according to claim 1, wherein the communication unit is wirelessly communicable with the imaging unit.

14. The illumination control apparatus according to claim 1, further comprising:

a plurality of shoes that hold the plurality of illumination apparatuses, wherein the communication unit is communicable with the plurality of illumination apparatuses via the plurality of shoes.

15. The illumination control apparatus according to claim 1, further comprising a flash unit so that the illumination control apparatus serves as an illumination apparatus for use in the main light emission, wherein the communication unit is wirelessly communicable with the imaging unit and the plurality of illumination apparatuses, the at least one processor is configured to perform further operations of:

based on the required light emission amount, determining light emission amounts of illumination apparatuses for use in the main light emission among the illumination control apparatus serving and the illumination apparatuses with which communication has been established by the communication unit.

16. An illumination control system that controls a plurality of illumination apparatuses for use in image capturing by an imaging unit, the illumination control system comprising:

a plurality of illumination apparatuses; and an illumination control apparatus comprising:

a communication unit that is communicable with the plurality of illumination apparatuses; and at least one processor configured to perform operations of:

outputting light amount information based on maximum light emission amounts of illumination apparatuses with which communication has been established by the communication unit among the plurality of illumination apparatuses;

obtaining a required light emission amount indicating a light emission amount required for image capturing by the imaging unit;

based on the required light emission amount, determining light emission amounts of illumination apparatuses for use in main light emission during image capturing among the illumination apparatuses with which communication has been established by the communication unit; and controlling the illumination apparatuses for use in the main light emission to emit light with the determined light emission amounts, wherein the at least one processor is configured to perform further operations of:

outputting, as the light amount information, information indicating a predetermined upper limit in a case where a total light amount obtained by adding up the maximum light emission amounts of the illumination apparatuses with which communication has been established by the communication unit is greater than the upper limit.

17. An imaging apparatus for image capturing using a plurality of illumination apparatuses, comprising:

an imaging unit that captures an image; and an illumination control apparatus comprising:

a communication unit that is communicable with the plurality of illumination apparatuses; and at least one processor configured to perform operations of:

outputting light amount information based on maximum light emission amounts of illumination apparatuses with which communication has been established by the communication unit among the plurality of illumination apparatuses;

obtaining a required light emission amount indicating a light emission amount required for image capturing by the imaging unit;

based on the required light emission amount, determining light emission amounts of illumination apparatuses for use in main light emission during image capturing among the illumination apparatuses with which communication has been established by the communication unit; and controlling the illumination apparatuses for use in the main light emission to emit light with the determined light emission amounts, wherein the at least one processor is configured to perform further operations of:

outputting, as the light amount information, information indicating a predetermined upper limit in a case where a total light amount obtained by adding up the maximum light emission amounts of the illumination apparatuses with which communication has been established by the communication unit is greater than the upper limit.

* * * * *